(12) United States Patent
Naruoka

(10) Patent No.: US 7,157,726 B2
(45) Date of Patent: Jan. 2, 2007

(54) METHOD AND APPARATUS FOR MEASURING SHAPE OF SHEET

(75) Inventor: Yasuhiko Naruoka, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 11/033,875

(22) Filed: Jan. 13, 2005

(65) Prior Publication Data
US 2005/0155419 A1 Jul. 21, 2005

(30) Foreign Application Priority Data
Jan. 16, 2004 (JP) .............................. 2004-009358

(51) Int. Cl.
*G01N 21/86* (2006.01)
*G01V 8/00* (2006.01)
(52) U.S. Cl. ........................ 250/559.19; 250/559.36; 250/559.22
(58) Field of Classification Search ........... 250/559.05, 250/559.07, 559.1, 559.15, 559.19, 559.22, 250/559.24, 559.26, 559.36; 356/637
See application file for complete search history.

(56) References Cited

U.S. PATENT DOCUMENTS 4,499,383 A * 2/1985 Loose ................... 250/559.36
6,311,539 B1 * 11/2001 Yeo et al. ................... 73/1.79
6,333,511 B1 * 12/2001 Talmi ................... 250/559.36

FOREIGN PATENT DOCUMENTS

JP 5-52526 A 3/1993
JP 6-147836 A 5/1994

* cited by examiner

Primary Examiner—Georgia Epps
Assistant Examiner—Brian Livedalen
(74) Attorney, Agent, or Firm—Birch, Stewart, Kolasch & Birch, LLP

(57) ABSTRACT

The method of making an online measurement of a shape of a conveyed sheet, the method comprises the steps of: imaging continuously at least two edge portions of entire the conveyed sheet in a widthwise direction of the conveyed sheet from a leading end to a trailing end of the conveyed sheet in a direction of conveyance of the conveyed sheet by means of a CCD line sensor; processing an image obtained in the imaging step to extract a sheet image portion corresponding to the conveyed sheet in the obtained image; and obtaining the shape of the conveyed sheet according to the sheet image portion extracted in the processing step.

11 Claims, 21 Drawing Sheets

BINARIZATION

FIG.14
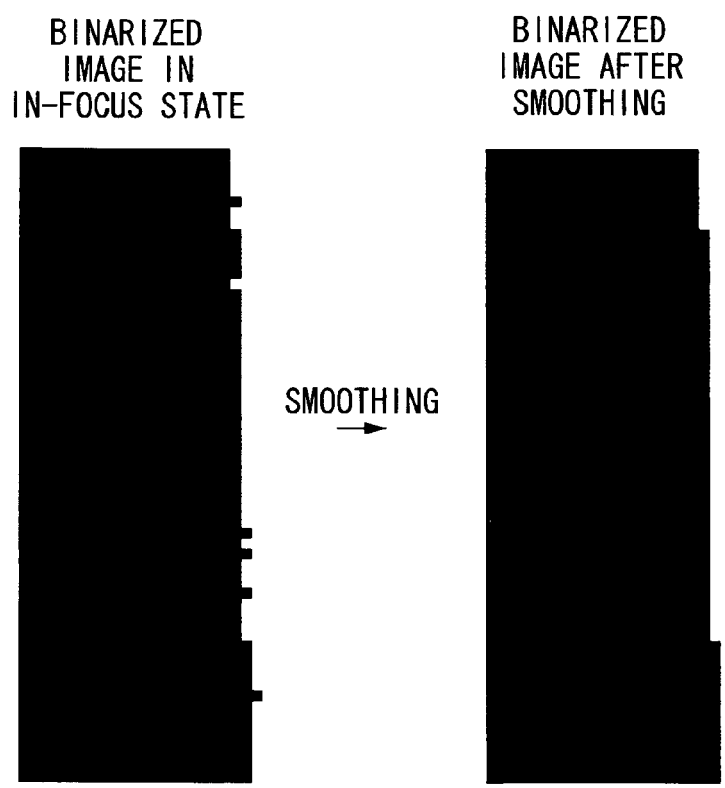
※SMOOTHING
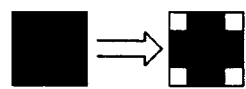
SMOOTHING IS PROCESSING FOR ROUNDING SHAPE. ONE PIXEL IS MADE BLACK IF FIVE OR MORE OF CENTRAL AND EIGHT SURROUNDING PIXELS ARE BLACK, AND ONE PIXEL IS MADE WHITE IF ONLY FOUR OR LESS ARE BLACK.

WHEN TWO LINE SENSORS ARE ALIGNED WITH EACH OTHER,
OBTAINED IMAGES OF RECTANGULAR SHEET ARE RECTANGULAR.
(IDEAL STATE)

WHEN TWO LINE SENSORS ARE NOT ALIGNED WITH EACH OTHER,
SHIFT OF THE LINE SENSORS IS REFLECTED IN OBTAINED IMAGES.

METHOD AND APPARATUS FOR MEASURING SHAPE OF SHEET

CROSS REFERENCE TO RELATED APPLICATION

The present non-provisional application claims priority under 35 USC 119 to Japanese Patent Application No. 2004-9358 filed on Jan. 16, 2004 the entire contents thereof is hereby incorporated by reference.

BACKGROUND OF THE INVENTION

1. Field of the Invention

The present invention relates to a method and apparatus for measuring the shape of a sheet and, more particularly, to a method and apparatus for performing online measurement of the shape of a sheet of a planographic printing plate provided with interleaving paper by using an optical measuring device.

2. Description of the Related Art

In recent plate making methods (including electrophotographic plate making methods), planographic printing plates such as photosensitive printing plates and thermosensitive printing plates are widely used to facilitate automatization of the plate making process. A planographic printing plate is generally manufactured as described below. One of surface treatments including sand dressing, anodization, a silicate treatment and other chemical treatments or a suitable combination of such treatments are performed on a supporting member such as an aluminum plate in the form of a sheet or a coil. Then, film coating treatment for forming a photosensitive layer or a thermosensitive layer (hereinafter referred to as a printing surface) on the supporting member, and drying treatment of the coating material are performed. The sheet thus formed is fed to a sheet working process and is cut by a predetermined slit width with a slitter and is thereafter cut by a predetermined cut length with a flying cutter, thus manufacturing a planographic printing plate in the form of a rectangular sheet.

To guarantee the product size of the cut planographic printing plate, in this sheet working process, sampling of the planographic printing plates is performed after cutting the plates in the form of sheets for, and the shape of the planographic printing plates, e.g., the product size (the slit width, the cut length, the perpendicularity) is measured by offline inspection, thereby enabling the provision of a guarantee of the size of the planographic printing plate. A certain number of operator steps are required for the offline inspection. Also, if a size abnormality is detected by the offline inspection, a one hundred percent inspection on the planographic printing plates having been cut before the completion of the offline inspection is required. If all the products inspected by the one hundred percent inspection have size abnormalities, a considerable loss, i.e., a product loss of a larger number of planographic printing plates, results.

In recent years, with the implementation of schemes to increase the sheet working processing speed, schemes to seal digital products in darkrooms, schemes to save manpower, etc., there has been a demand for introducing online measurement apparatuses capable of automatization of various visual process inspections and online real-time measurement.

An apparatus for online measurement of the shape of a sheet, e.g., one disclosed in Japanese Patent Application Publication No. 5-52526 or one disclosed in Japanese Patent Application Publication No. 6-147836 has at least four sets of CCD cameras and stroboscopic devices (Japanese Patent Application Publication No. 5-52526) or at least four sets of transmission-type photosensors and stroboscopic devices (Japanese Patent Application Publication No. 6-147836) positioned in correspondence with four sides or four corners of a conveyed sheet so that the four sides or four corners of the sheet can be imaged at a time, and instantaneously images the sheet by synchronizing the CCD or the sensor and the stroboscopic device with arrival of the sheet at each sensor position.

The online shape measurement apparatuses disclosed in Japanese Patent Application Publication Nos. 5-52526 and 6-147836, however, have a drawback in that it is difficult to accurately synchronize the plurality of CCD cameras or transmission-type photosensors, and a measurement error can occur easily under the existing circumstances where the sheet conveyance speed (line speed) in the sheet working process is increased.

In the case of a planographic printing plate formed from a sheet having a photosensitive layer, there is a possibility of occurrence of fog in the photosensitive layer due to the strobe lighting. Further, since at least four sets of CCD cameras (or transmission-type photosensors) and stroboscopic devices are provided, the overall size of the apparatus is increased and the measurement apparatus cannot be used if the installation space is not sufficiently large.

Furthermore, if the sheet changes in attitude by meandering of the sheet conveyor or floats due to curl at a sheet corner or flutter of the sheet during online measurement on the sheet shape, or if the accuracy with which image pickup devices for imaging the sheet shape are mounted is low, an accurate sheet shape measurement cannot be made. To make an accurate online sheet shape measurement, therefore, it is necessary to solve the problem that the sheet changes in attitude and floats and the problem relating to the accuracy with which image pickup devices are mounted as well as the problems relating to Japanese Patent Application Publication Nos. 5-52526 and No. 6-147836.

SUMMARY OF THE INVENTION

In view of the above-described circumstances, an object of the present invention is to provide a sheet shape online measurement method and apparatus capable of making an online measurement on the shape of a sheet with high accuracy even when the sheet is conveyed at a high speed, reducing the size of the apparatus in comparison with the conventional art, eliminating a possibility of fog even if the sheet is a planographic printing plate having a photosensitive layer, and making an online measurement on the shape of a sheet with high accuracy no matter what a change in attitude or floating of the sheet during measurement or the accuracy with which the image pickup means is mounted.

In order to attain the aforementioned object, according to one aspect of the present invention, a method of making an online measurement of a shape of a conveyed sheet, the method comprises the steps of: imaging continuously along entire lengths of at least two edge portions of entire the conveyed sheet from a leading end to a trailing end of the conveyed sheet in a direction of conveyance of the conveyed sheet by means of a CCD line sensor; processing an image obtained in the imaging step to extract a sheet image portion corresponding to the conveyed sheet in the obtained image; and obtaining the shape of the conveyed sheet according to the sheet image portion extracted in the processing step.

According to the first aspect, at least two edge portions of the entire conveyed sheet in the widthwise direction of the sheet are continuously imaged with the CCD line sensor from the leading end to the trailing end of the sheet in the direction of conveyance of the sheet. Thus, the need for synchronization between a plurality of CCD cameras or transmission-type photosensors as in the case of the conventional art is eliminated and the accuracy of imaging is therefore improved. Therefore, if the image obtained by accurate imaging is processed to extract the sheet image portions corresponding to the sheet in the obtained image, and if the shape of the sheet is obtained from the extraction results, the shape of the sheet can be measured with high accuracy even if the sheet conveyance speed (line speed) is high. Also, there is no need for strobe lighting such as that used in the conventional method of instantaneously imaging the sheet shape with a plurality of CCD cameras or transmission-type photosensors. Therefore, even in a case where the sheet is a planographic printing plate having a photosensitive layer, there is substantially no possibility of fog in the photosensitive layer. Further, the size of the measurement apparatus is reduced in comparison with the conventional art and the measurement apparatus can be easily used in a restricted installation space.

According to a second aspect of the present invention, the method in the first aspect is characterized in that imaging is continuously performed only along the entire lengths of the two edge portions of the conveyed sheet with a pair of CCD line sensors positioned in correspondence with the two edge portions in the imaging step; and the distance by which the pair of the CCD line sensors are spaced apart from each other is reflected in computation for obtaining the shape of the conveyed sheet.

In the case of the present invention, the entire sheet can be imaged with one CCD line sensor if the sheet width is small. However, if the sheet width is large, the sheet cannot be imaged with one CCD line sensor. In such a case, only the two edge portions may be imaged with a pair of CCD line sensors and the distance by which the pair of the CCD line sensors are spaced apart from each other may be reflected in computation for obtaining the shape of the sheet. In a case where the sheet width is so large that the sheet cannot be imaged with one CCD line sensor, a plurality of CCD line sensors may be disposed in series so as to cover the entire sheet in the widthwise direction.

According to a third aspect of the present invention, the method in the first aspect or the second aspect is characterized in that a portion in the extracted sheet image portion corresponding to a portion of the conveyed sheet at which meandering or floating of the conveyed sheet has occurred is excluded from computation for obtaining the shape of the conveyed sheet.

If the sheet meanders or a corner portion of the sheet floats during measurement on the sheet with the CCD line sensors, an image of the corresponding sheet portion cannot be obtained as an image in which the sheet shape is correctly reflected. Such an image portion becomes a cause of a computational error if used in the computation of the sheet shape. Therefore, such an image portion is excluded from the computation. In this way, the measurement accuracy can be improved.

According to a fourth aspect of the present invention, the method in any of the first to third aspects is characterized in that a plurality of CCD line sensors are disposed in the direction of conveyance of the conveyed sheet to continuously image the conveyed sheet; and the leading end and the trailing end of the conveyed sheet are imaged simultaneously with each other in the imaging step.

In a case where the sheet is imaged with one CCD line sensor during conveyance of the sheet, it is possible that the sheet will be imaged in a non-meandering state at the leading end and in a meandering state at the trailing end due to the time difference between imaging at the leading end and imaging at the trailing end. In such a case, the resulting image becomes a cause of an error if it is used without being corrected. In the fourth aspect, a plurality of CCD line sensors are disposed in the direction of conveyance of the sheet to continuously image the sheet, and the leading end and the trailing end of the sheet are imaged simultaneously with each other in the process of continuous imaging. In this way, the cause of an error due to the imaging time difference can be eliminated to improve the measurement accuracy.

According to a fifth aspect of the present invention, the method in any of the first to fourth aspects is characterized in that a pair of CCD line sensors for measuring the two edge portions of the conveyed sheet are disposed at left and right positions in the widthwise direction of the conveyed sheet; a calibration sheet on which square meshes uniform in line width are arrayed in grid form is conveyed at a speed that is low enough to prevent meandering and is imaged with the pair of CCD line sensors; determination is made from images of the calibration sheet obtained by the imaging as to whether or not there is any relative shift between placements of the pair of CCD line sensors; and if there is a relative shift between the placements of the pair of CCD line sensors, the shape of the conveyed sheet is computed by making compensation for the relative shift in the placements.

In a case where two edge portions of the sheet are imaged with a pair of CCD line sensors, the sheet shape cannot be correctly imaged unless the pair of CCD line sensors are disposed on one straight line perpendicular to the direction of conveyance of the sheet. However, it is extremely difficult to mount the pair of line sensors having an array of 1000 or more CCD elements for forming pixels each having a size of about 10 µm×10 µm in the grid pattern, by disposing them in alignment with each other while spacing them by a certain distance apart from each other.

In the fifth aspect, the measurement accuracy can be improved even if the pair of CCD line sensors are not correctly disposed in alignment with each other. The calibration sheet in which square meshes uniform in line width are arrayed in grid form is used to easily obtain a relative shift between the placements of the pair of CCD line sensors (an angular shift or a shift in the sheet conveyance direction with reference to the above-mentioned straight line used as a reference line). If there is a placement shift, the sheet shape may be computed by making compensation for the placement shift obtained by imaging the calibration sheet, thus improving the measurement accuracy no matter what the accuracy with which the pair of CCD line sensors are placed (e.g., the mount accuracy).

In order to attain the aforementioned object, according to a sixth aspect of the present invention, an apparatus which makes an online measurement of a shape of a conveyed sheet, the apparatus comprises: a CCD line sensor which performs a continuous imaging to image along the entire lengths of at least two edge portions of the conveyed sheet from a leading end to a trailing end of the conveyed sheet in a direction of conveyance of the conveyed sheet; an image processing device which processes an image obtained by the continuous imaging to extract a sheet image portion corresponding to the conveyed sheet in the obtained image; and a computation device which computes the shape of the conveyed sheet according to the extracted sheet image portion.

In the sixth aspect, the present invention is applied as an apparatus. Any of an arrangement in which one CCD line sensor images the entire sheet in the widthwise direction, an arrangement in which one pair of CCD line sensors image only two edge portions of the entire sheet in the widthwise direction and an arrangement in which a plurality of CCD line sensors are disposed in series so as to cover the entire sheet in the widthwise direction may be adopted. A device for binarizing the image obtained by continuous imaging can be preferably used as the image processing device. A computer can be preferably used as the computation device.

In a seventh aspect of the present invention, the apparatus in the sixth aspect is characterized in that the computation device computes a pixel-by-pixel resolution of the CCD line sensors from the extracted sheet image portion and a line speed, draws four approximate lines for four sides of the conveyed sheet, and computes a slit width, a cut length and a perpendicularity of the conveyed sheet according to distances between points of intersection of the four approximate lines and angles at which the approximate lines intersect.

In the seventh aspect, a preferable way of computation in the case of measuring the slit width, the cut length and the perpendicularity as measurements on the shape of the sheet is shown.

According to an eighth aspect of the present invention, the apparatus in the sixth or seventh aspect is characterized in that a plurality of the CCD line sensors are disposed at a plurality of positions in the direction of conveyance of the conveyed sheet such as to be able to simultaneously image the leading end and the trailing end of the conveyed sheet.

In the eighth aspect, the method in the fourth aspect is arranged as an apparatus in such a manner that a plurality of CCD line sensors are disposed in the direction of conveyance of the sheet to continuously image the sheet, and the leading and trailing ends of the sheet are imaged simultaneously with each other in the process of continuous imaging. In this way, the cause of an error due to the imaging time difference can be eliminated to improve the measurement accuracy.

According to the sheet shape measurement method and apparatus of the present invention, as described above, an online measurement on the sheet shape can be made with high accuracy even when the sheet is conveyed at a high speed, the size of the apparatus can be reduced in comparison with the conventional art, there is substantially no possibility of fog even in a case where the sheet is a planographic printing plate having a photosensitive layer, and the sheet shape can be measured with high accuracy no matter what a change in attitude or floating of the sheet during measurement or the accuracy with which the image pickup means is mounted.

BRIEF DESCRIPTION OF THE DRAWINGS

The nature of the present invention, as well as other objects and advantages thereof, will be explained in the following with reference to the accompanying drawings, in which like reference characters designate the same or similar parts throughout the figures and wherein:

FIG. 14 is a diagram for explaining smoothing in a case where the boundary lines between the planographic printing plate image portions and the other image portions after binarization are not definite;

DETAILED DESCRIPTION OF THE PREFERRED EMBODIMENTS

Preferred embodiments of a sheet shape measurement method and apparatus in accordance with the present invention will be described with reference to the accompanying drawings.

Figure 1:
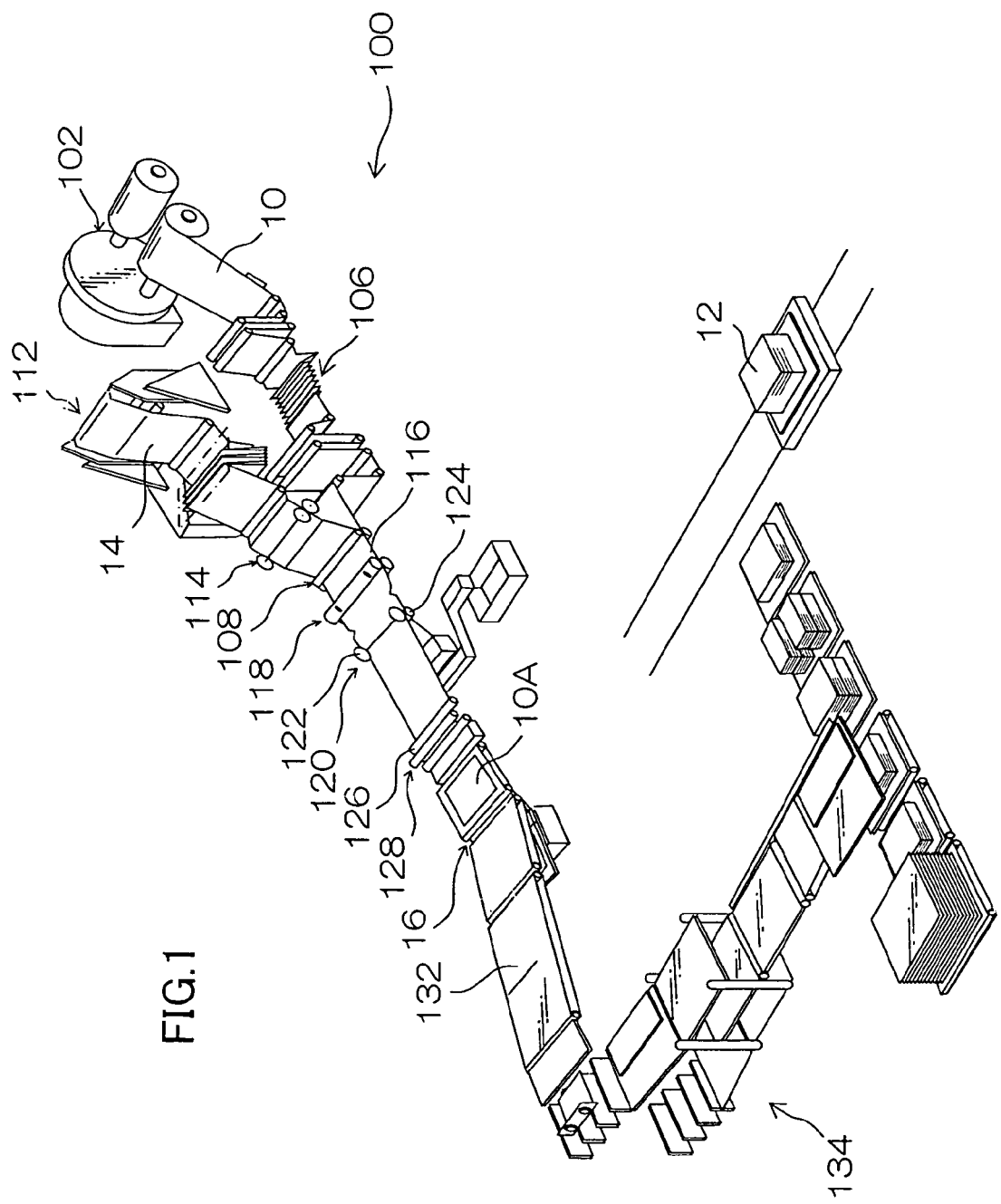
FIG. 1 is a diagram showing the construction of a planographic printing plate working line incorporating a sheet shape measurement apparatus of the present invention.

FIG. 1 shows a planographic printing plate working line 100 incorporating a sheet shape measurement apparatus 16 according to an embodiment of the present invention. This embodiment will be described with respect to a case where a sheet to be subjected for the shape measurement is a planographic printing plate having a photosensitive layer. However, the present invention is not limited to this.

A feeder 102 is provided on the upstream side of the working line 100 (at the upper right of FIG. 1). In the feeder 102, a length of a planographic printing plate 10 (a raw roll) wound in coil form is loaded. The planographic printing plate 10 is unwound from the feeder 102 and fed into the working line 100. The fed planographic printing plate 10 undergoes curl straightening performed by a leveler 106. The planographic printing plate 10 is controlled by the feeder 102 so as to run at a center of the feed path. However, there is a possibility of the planographic printing plate 10 shifting in a transverse direction by a one-sided condition during running. Therefore the position of the planographic printing plate 10 is regulated with a center position control (CPC) device (not shown) so as to run at the specified position (center position). The CPC device may be configured in such a manner that, for example, a camera for detecting the position of an edge portion of the widthwise direction of the uncut planographic printing plate 10 is provided, and the roller around which the planographic printing plate 10 is wrapped is inclined on the basis of the position of the edge portion detected with the camera so that the position of the center of the planographic printing plate 10 in the widthwise direction runs on a certain position. At a superposition device 108, an interleaving paper sheet 14 is superposed on and bonded by using electrification to the planographic printing plate 10 controlled so as to run through the center position as described above.

On the other hand, the interleaving paper sheet 14 is loaded in a feeder 112 in a state of being wound in coil form. The interleaving paper sheet 14 is unwound and fed out from the feeder 112. A tensile force for conveyance is applied to the interleaving paper sheet 14 by means of a dancer roller or the like, and the conveyed position of the interleaving paper sheet 14 in the widthwise direction is controlled with an edge position control (EPC) device (not shown) so as to be adjusted to a center of the line. The interleaving paper sheet 14 is thereafter trimmed with a slitter device 114 to have a predetermined width.

At the time of slitting of the interleaving paper sheet 14, the slitter device 114 is positioned so that the left and right slit positions are balanced about the line center with accuracy. The interleaving paper sheet 14 slit with the slitter device 114 runs through the line center to be superposed on the planographic printing plate 10 running through the line center. The combination of the uncut planographic printing plate 10 and the interleaving paper sheet 14 superposed on each other will be hereinafter referred to as web 116.

The web 116 is transported to a notcher 118, which notches selvages of the web 116. According to the positions of the notches thereby formed, upper trimming blades 122 and lower trimming blades 124 of a slitter device 120 described below are moved in the widthwise direction of the planographic printing plate 10.

The web 116 having the selvages notched by the notcher 118 is transported to the slitter device 120 and is trimmed with the upper trimming blades 122 and the lower trimming blades 124 of the slitter device 120 setting a predetermined slit width. At this time, the upper trimming blades 122 and the lower trimming blades 124 can be moved in the widthwise direction of the web 116 according to the notch positions to change the trimming width (slit width), while the web 116 is being continuously cut.

A fed length of the web 116 cut by the predetermined slit width is measured with a length measurement device 126, and the web 116 is thereafter cut by a designated cut length with a flying cutter 128. A planographic printing plate 10A having a set size is thus manufactured. The product size of the planographic printing plate 10A is not specially limited to certain values. However, it is preferred that the size in the lengthwise direction (slit width) be 200 mm to 2000 mm and the size in the widthwise direction (cut width) be 400 mm to 2000 mm.

The shape (the slit width, the cut length and the perpendicularity) of the planographic printing plates 10A in the product size is optically measured by the sheet shape measurement apparatus 16 of the present embodiment, and the planographic printing plates 10A are grouped into nondefectives and defectives according to the measurement results. The nondefectives are conveyed to an accumulation unit 134 by the conveyor 132.

In the accumulation unit 134, a predetermined number of the planographic printing plates 10A to which the interleaving paper sheets 14 are bonded are stacked. A stack 12 of the planographic printing plates 10A in which the planographic printing plates 10A and the interleaving paper sheets 14 are alternately stacked is thereby formed. The number of the planographic printing plates 10 constituting one stack 12 is not particularly specified but it may be set to, for example, ten to one hundred from the viewpoint of improving the efficiency of transport and storage for example. Two accumulation units 134 may be provided and alternately used for accumulation of stacks 12 to enable continuous cutting of the web 116 even when stacks 12 are taken out.

The sheet shape measurement apparatus 16 of the invention will be described.

Figure 2:
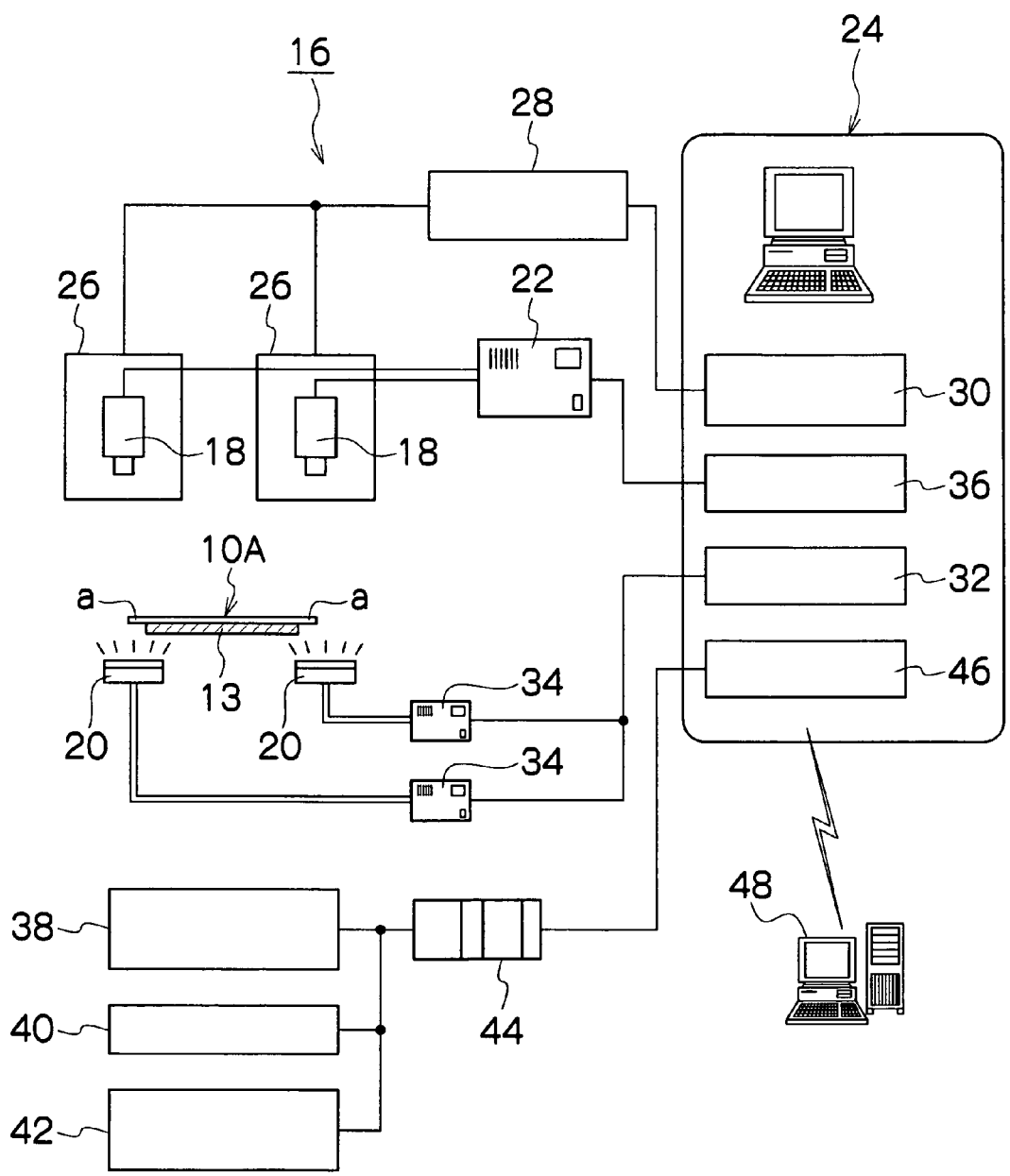
FIG. 2 is a diagram showing the overall configuration of the sheet shape measurement apparatus of the present invention.

FIG. 2 is a diagram showing the entire configuration of the sheet shape measurement apparatus 16.

As shown in FIG. 2, the sheet shape measurement apparatus 16 mainly comprises: a pair of CCD line sensors 18 which are provided at places through which left and right edge portions a of the planographic printing plate 10A (at the left and right ends as viewed in FIG. 2) pass, and with which the left and right edge portions a in the entire planographic printing plate 10A in the widthwise direction transported by a conveyor apparatus 13 in a front-back direction as viewed in FIG. 2 are continuously imaged from the front end to the rear end in the direction of conveyance of the planographic printing plate; a pair of illumination devices 20 for illuminating the planographic printing plate 10A with light for measurement from the back side; an image processor 22 which processes images obtained by continuous imaging to extract planographic printing plate image portions corresponding to the planographic printing plate 10A in the images; and an inspection computer 24 which performs computations relating to the shape of the planographic printing plate 10A on the basis of the extracted sheet image portions.

Figure 3:
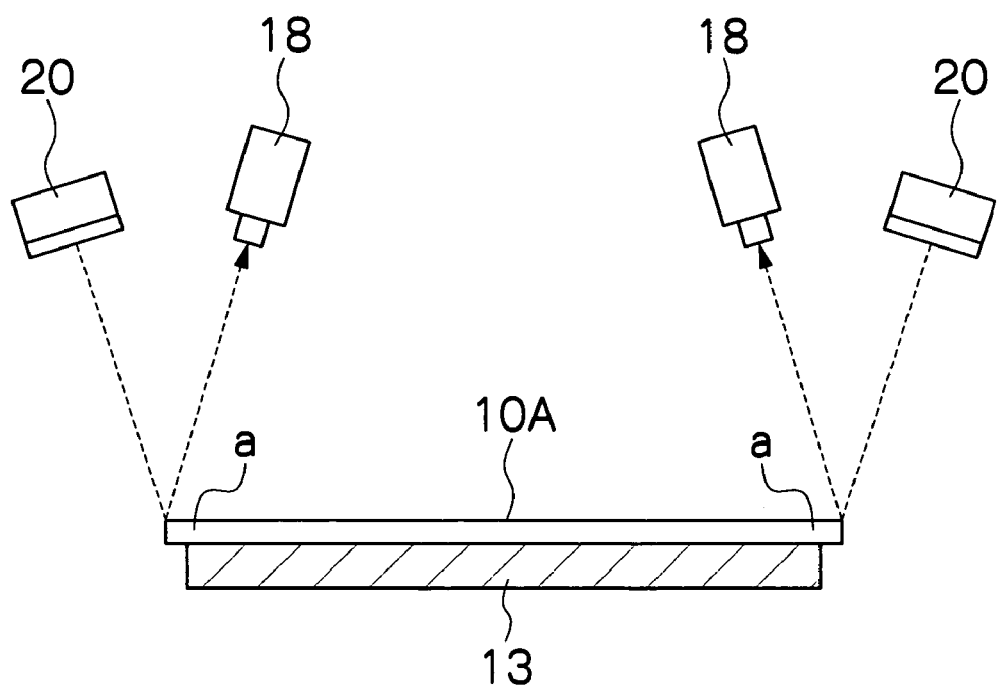
FIG. 3 is a diagram for explaining a case where the sheet shape measurement apparatus of the present invention is of a reflection type.

Continuous imaging of the planographic printing plate 10A with the CCD line sensors 18 is performed when the planographic printing plate 10A is transferred from an upstream conveyor 60 to a downstream conveyor 62. The conveyors 60 and 62 constitute the conveyor apparatus 13. The imaging type is not limited to the transmission type shown in FIG. 2, where the illumination devices 20 emit from the back side of the planographic printing plate 10A the illumination light to be received by the CCD line sensors 18. The imaging type may alternatively be of a reflection type such that the illumination devices 20 are disposed on the same side as the CCD line sensors and light reflected by the planographic printing plate 10A is received by the CCD line sensors as shown in FIG. 3. A pair of illumination devices 20 are not necessarily required. One illumination device 20 may illuminate the left and right edge portions a of the planographic printing plate 10A.

The resolution and the scanning speed of the CCD line sensors 18 are selected according to the required measurement accuracy and line speed (the speed of conveyance of the planographic printing plate 10A). For example, if the size accuracy of the slit width of the planographic printing plate 10A is +0.125 mm; the cut length, ±0.25 mm; the perpendicularity, ±0.02°; meandering of the planographic printing plate 10A, not larger than 5 mm; and the line speed, 150 m/minute, imaging of the left and right edges a of the planographic printing plate 10A may be performed by using 1024 bit-100 MHz CCD line sensors 18 with a lens for 20 mm-width measurement. The resolution in this case is about 20 µm in the widthwise direction of the planographic printing plate 10A and about 30 µm at the maximum in the conveyance direction.

The pair of CCD line sensors 18 are respectively mounted on a pair of X-Z stages 26, which are driven by a motor control driver 28 according to an instruction from a motion controller 30 incorporated in the inspection computer 24. The spaced positions of the pair of line sensors 18 are determined according to the width of the planographic printing plate 10A by moving the X-Z stages 26 in the X-direction (the widthwise direction of the planographic printing plate). The distance by which the pair of line sensors 18 are spaced apart from each other by positioning is inputted to the inspection computer 24 to be used for computation of the width at the time of measurement of the shape of the planographic printing plate 10A described below. The distance between the CCD line sensors 18 and the planographic printing plate 10A is adjusted to the focal distance of the CCD line sensors 18 by moving the X-Z stages 26 in the Z-direction (the direction in which the X-Z stages 18 are moved closer to or away from the planographic printing plate).

The lighting intensity or the like of the illumination devices 20 is adjusted with light source amplifiers 34 according to an instruction from an illumination adjustment board 32 incorporated in the inspection computer 24. The image processor 22 exchanges signals with the inspection computer 24 through an interface (I/F) board 36 incorporated in the inspection computer 24. Outputs from an operating panel 38 relating to various switches, indication lamps and sensors from an operating panel 38 of the sheet shape measurement apparatus 16, line pulses from a sensor 40 for measuring the line speed (the speed of conveyance of the planographic printing plate) and signals from an input/output device 42, e.g., an OK/NG signal are inputted to the inspection computer 24 via a sequencer 44 and a CC link board 46 incorporated in the inspection computer 24. The CC link board 46 is a board connecting a sequencer and the inspection computer 24. Signal exchange is also performed between the inspection computer 24 and a production management computer 48. To the inspection computer 24, lot numbers and thickness data for planographic printing plates 10A to be measured by the sheet shape measurement apparatus 16, data on the slit width in slitting with the slitter device 120, data on the cut width in cutting with the flying cutter 128, etc., are inputted.

Figure 4A:
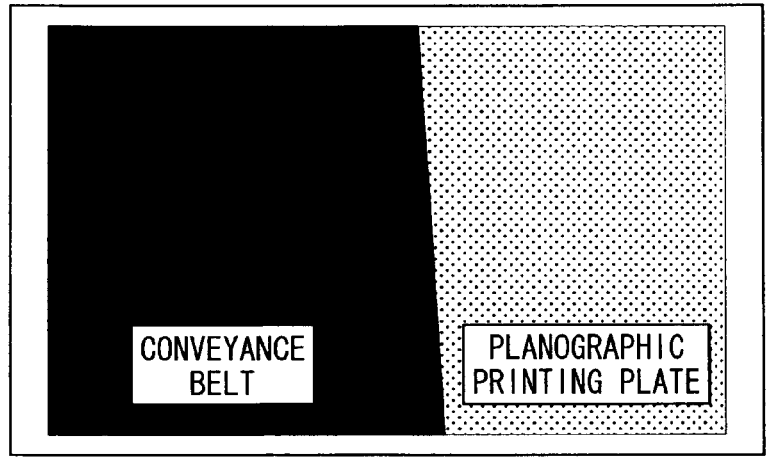
FIGS. 4A and 4B are diagrams of an image obtained by continuously imaging a planographic printing plate with a CCD line sensor, showing states of the image before and after binarization.
Figure 4B:
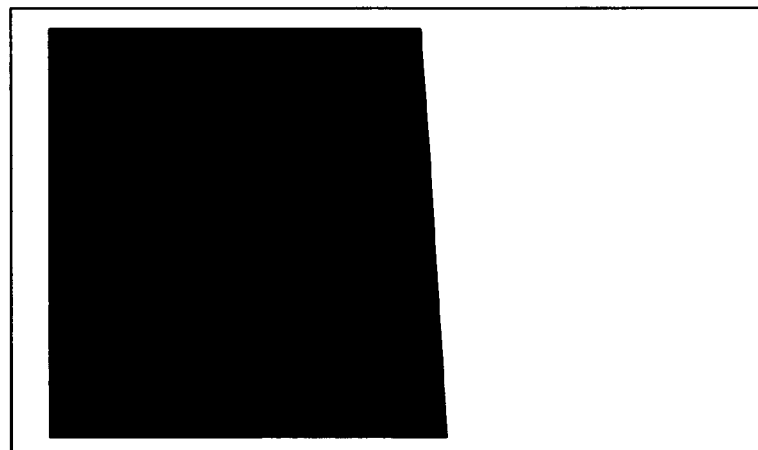
Figure 5:
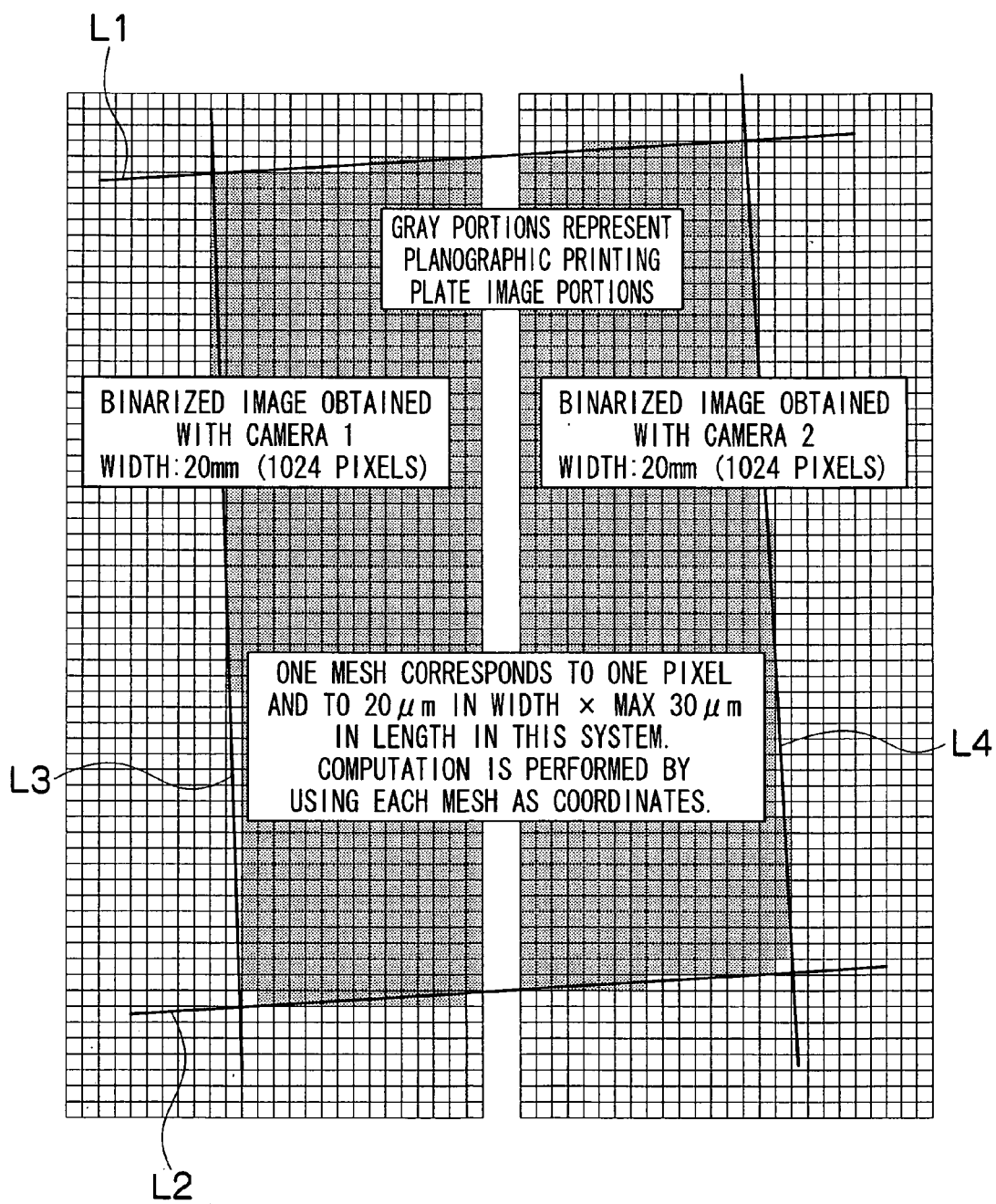
FIG. 5 is a diagram showing planographic printing plate image portions after binarization, which are extracted while leaving the other image portions.

Continuous imaging of the left and right edge portions a of the conveyed planographic printing plate 10A is performed with the pair of line sensors 18 while the planographic printing plate 10A is being illuminated by the illumination devices 20, thereby obtaining an image such as shown in FIG. 4A. The obtained image is processed by binarization in the image processor 22 to obtain a boundary between the image portion corresponding to the planographic printing plate 10A and the other image portion, as shown in FIG. 4B. FIG. 5 shows the results of continuous imaging of the left and right edge portions a of the entire planographic printing plate 10A in the widthwise direction with the pair of CCD line sensors 18 from the front end to the rear end of the planographic printing plate 10A and binarization of the images obtained by continuous imaging. A blank at a center in FIG. 5 corresponds to the position out of the imaging ranges of the CCD line sensors 18. Dark-colored portions in FIG. 5 are the image portions corresponding to the left and right edge portions a of the planographic printing plate 10A, light-colored portions are the image portions corresponding to regions other than the planographic printing plate 10A. Only the planographic printing plate image portions corresponding to the planographic printing plate 10A in the images obtained by continuous imaging are extracted by performing binarization on the obtained images.

The inspection computer 24 computes the pixel-by-pixel resolution of the CCD line sensors 18 from the obtained binarized images and the line speed obtained from line pulses, draws four approximate lines L1 to L4 for the four sides of the rectangular planographic printing plate 10A by a computation method described below, and computes the slit width, the cut length and the perpendicularity from the distances between the points of intersection of the four approximate lines L1 to L4 and the angles at which the approximate lines intersect. The shape of the planographic printing plate 10A (the slit width, the cut length and the perpendicularity) is thus measured. The slit width is the length of the dark-colored planographic printing plate image portions in the lateral direction shown in FIG. 5 (the length between L3 and L4), and the cut length is the length in the longitudinal direction (the length between L1 and L2).

The computation method for drawing approximate lines L1 to L4 will be described.

Figure 6:
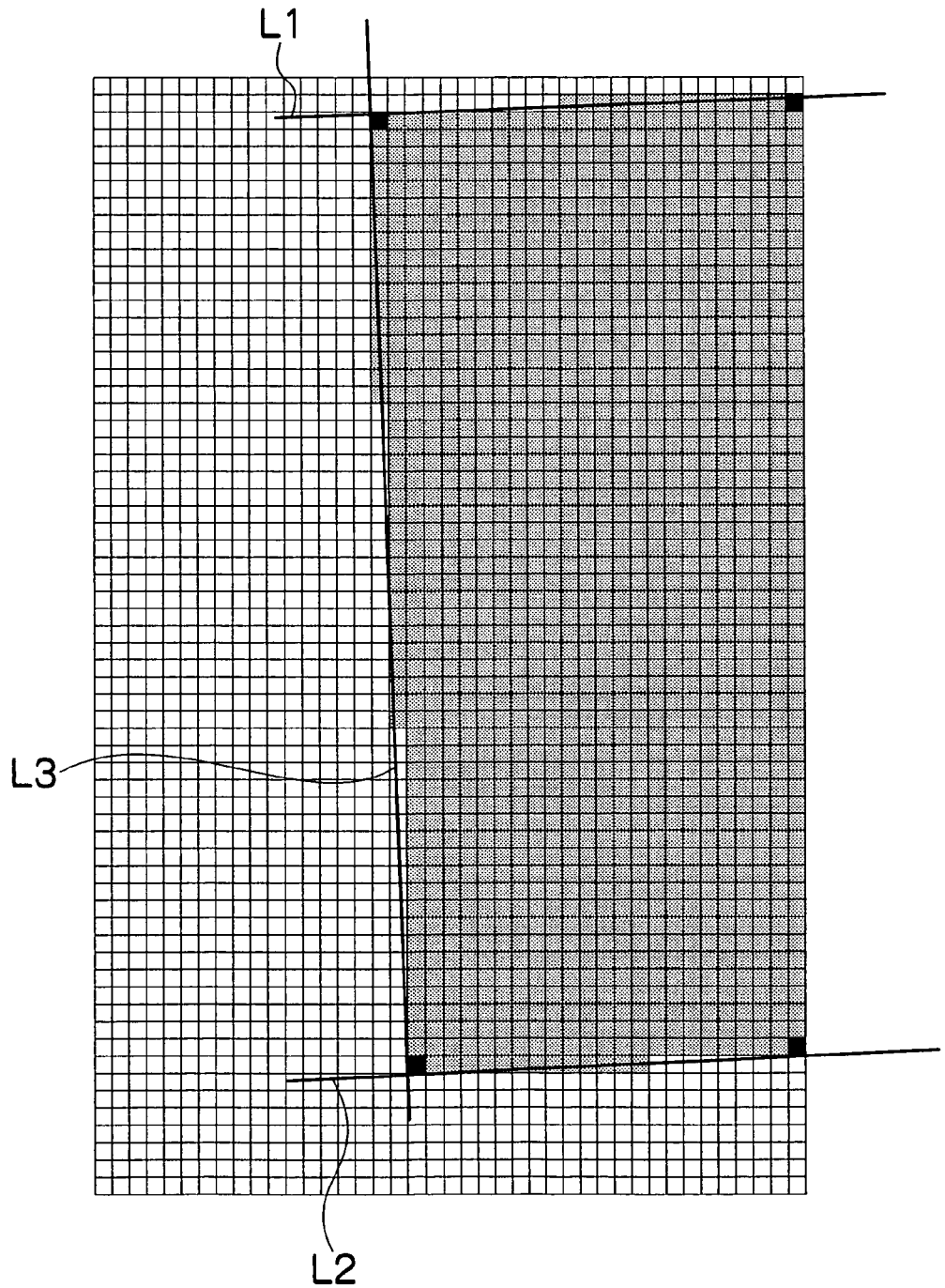
FIG. 6 is a diagram for explaining a computation method 1 for drawing approximate lines for boundary lines between the planographic printing plate image portions and the other image portions after binarization.

FIG. 6 is a diagram for a first example of the computation method (referred to as computation method 1), showing the left edge portion a in the left and right edge portions shown in FIG. 5. Similar diagrams are provided for explanation of other examples of the computation methods. The approximate line L4 in FIG. 5 is not shown in FIG. 6.

In the computation method 1, approximate lines L1 to L4 connecting to each of the pairs of points at the four boundary ends (four corners) of the planographic printing plate image portions after binarization are drawn and the angles are computed from the gradients of the lines and the size of one pixel. The computation method 1 uses the most basic and simplest way of drawing the approximate lines L1 to L4 and has the advantage of computing at a high speed. In the computation method 1, however, a large measurement error may result from failure to accurately perform binarization at the left and right edge portions a of the planographic printing plate 10A. The left and right edge portions a of the planographic printing plate 10A may vibrate (flutter) to cause failure to accurately perform binarization, depending on the actual condition of the planographic printing plate 10A, e.g., a selvage deformation (curl) in the left and right edge portions a due to a curled state derived from the raw roll for the planographic printing plate 10A, or the condition of conveyance of the planographic printing plate 10A, e.g., belt vibration in the sheet shape measurement apparatus 16 or the conveyor apparatus 13. In such a case, it is preferable to select other computation methods.

Figure 7:
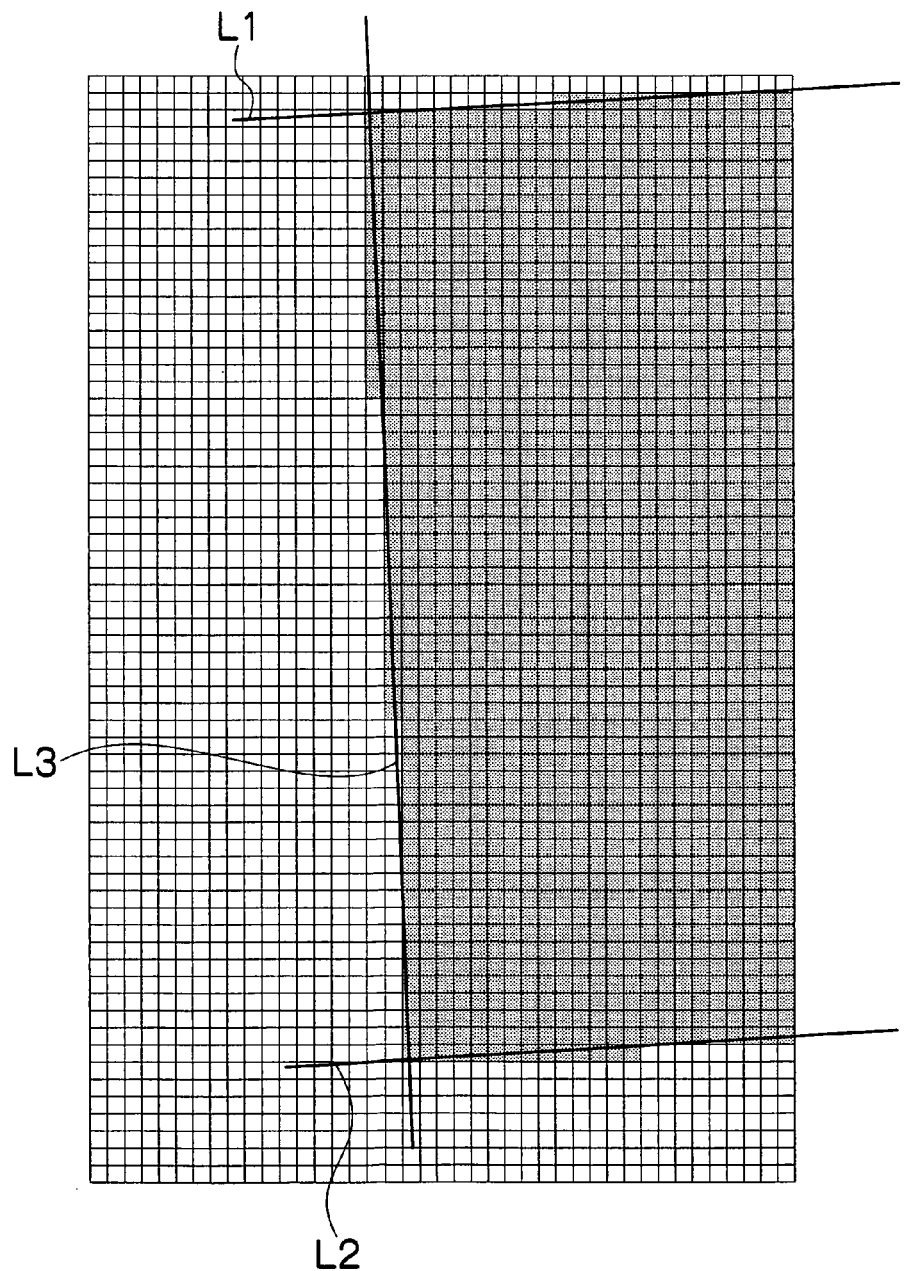
FIG. 7 is a diagram for explaining a computation method 2 for drawing approximate lines for boundary lines between the planographic printing plate image portions and the other image portions after binarization.

FIG. 7 is a diagram for a second example of the computation method (referred to as computation method 2), in which approximate lines L1 to L4 are drawn by the least square method at the boundary lines between the planographic printing plate image portions and the other image portions after binarization and the angles are computed from the gradients of the approximate lines L1 to L4 and the size of one pixel. The number of coordinates used for approximation can be freely set. In a case where extraction of the four boundary ends of the planographic printing plate image portions is not accurately performed, a method is also effective in which approximate lines L1 to L4 are drawn by plotting the coordinates of the left and right edge portions a and by using the least square method.

Figure 8:
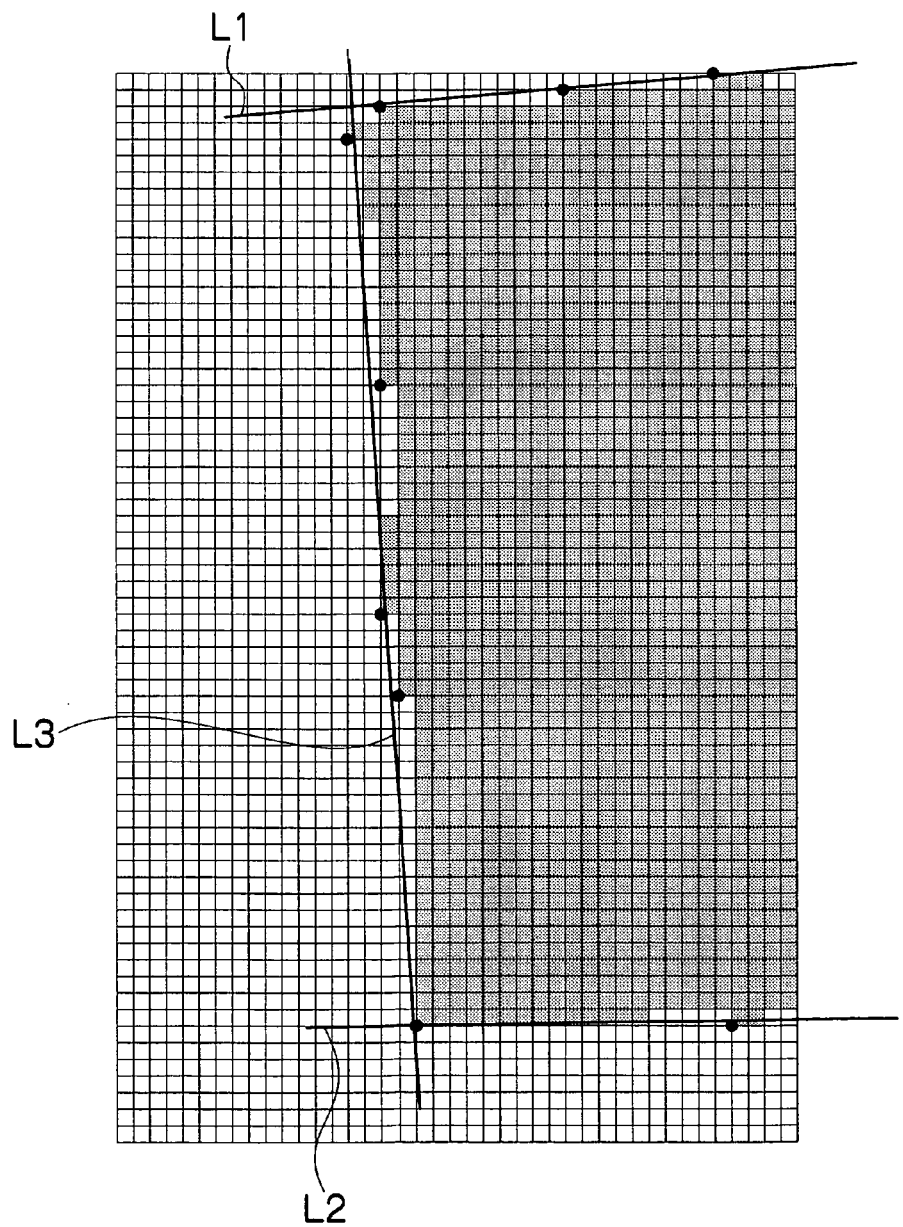
FIG. 8 is a diagram for explaining a computation method 3 for drawing approximate lines for boundary lines between the planographic printing plate image portions and the other image portions after binarization.

FIG. 8 is a diagram for a third example of the computation method (referred to as computation method 3), in which approximate lines L1 to L4 are drawn by extracting only points at which the slit width is maximum in the boundary lines between the planographic printing plate image portions and the other image portions after binarization and by using the least square method, and the angles are computed from the gradients of the approximate lines L1 to L4 and the size of one pixel.

Figure 9A:
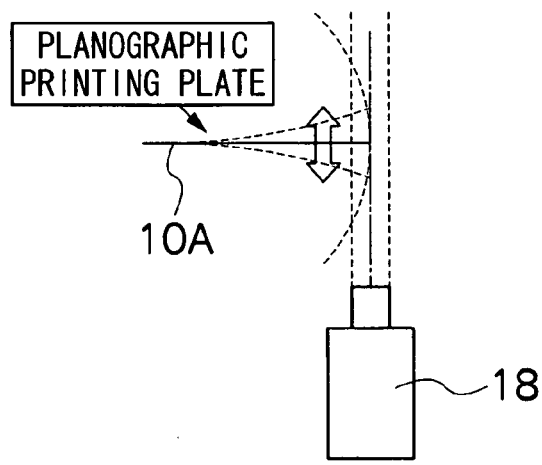
FIGS. 9A and 9B are diagrams for explaining the way of drawing approximate lines when edge portions of the planographic printing plate vibrate.
Figure 9B:
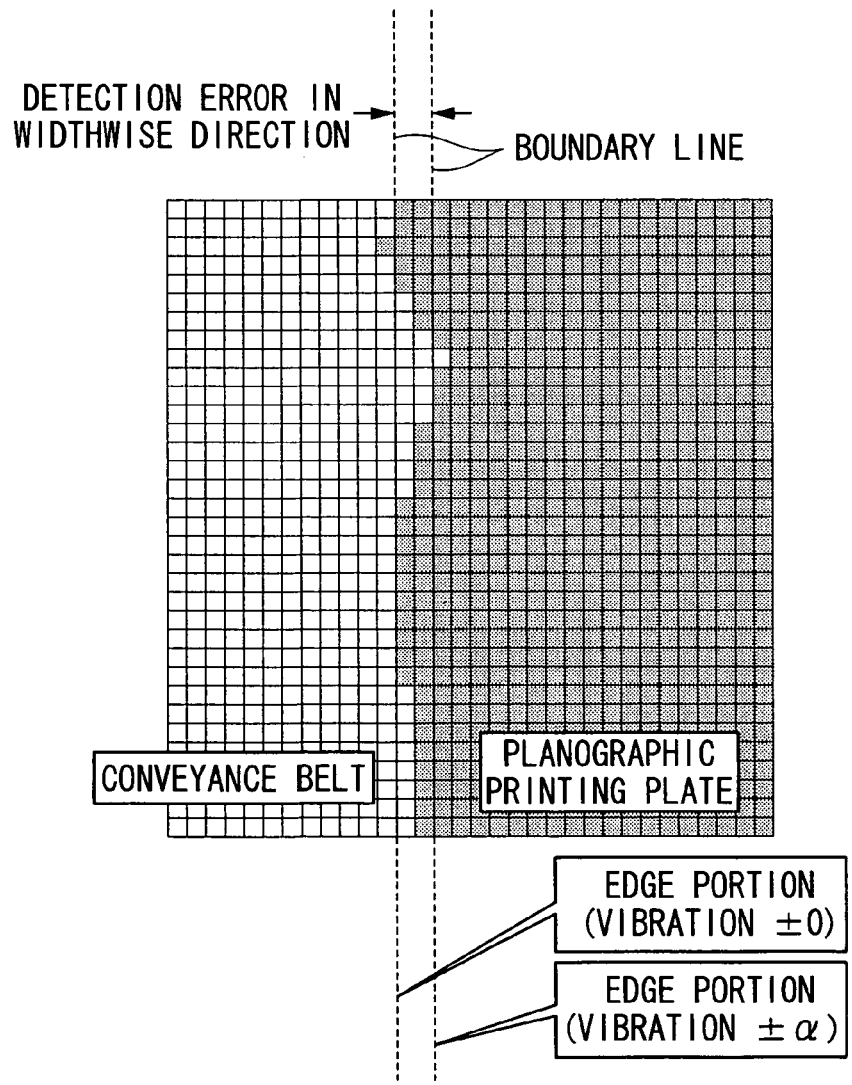
Figure 10A:
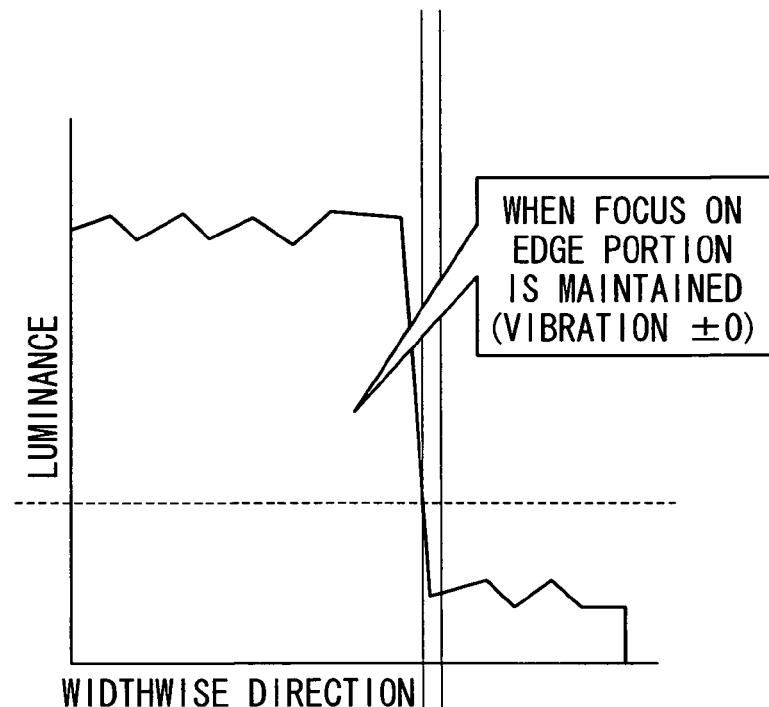
FIGS. 10A and 10B are diagrams for explaining a difference in luminance at a boundary portion between a case where a focus on the edge portion of the planographic printing plate is achieved and a case where a focus on the edge portion of the planographic printing plate is not achieved.
Figure 10B:
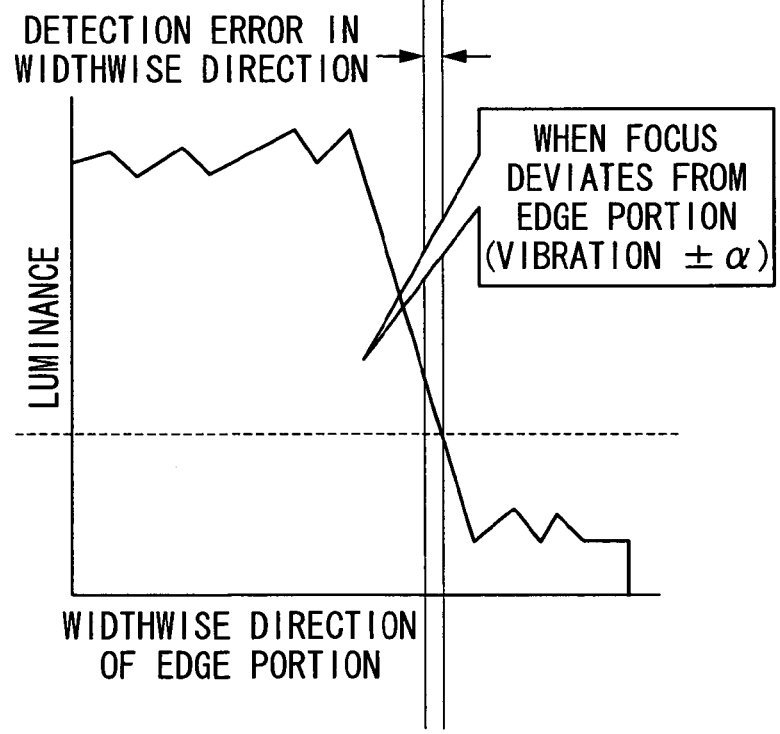

Conveyance of the planographic printing plate 10A at the time of measurement of the shape of the planographic printing plate 10A may be performed in such a manner that a center portion of the planographic printing plate 10A is pinched between upper and lower conveyors. In such a case, there is a possibility of the left and right edge portions a of the planographic printing plate 10A vibrating in such a direction that the focal points of the CCD line sensors 18 are shifted in the vertical direction (the images are defocused) as shown in FIG. 9A. The change in luminance difference at each edge portion a with respect to the position in the widthwise direction (the gradient) becomes smaller when the focal point of the CCD line sensor 18 is shifted in the vertical direction (as shown in FIG. 10B) than when the focal point of the CCD line sensor 18 coincides with the edge portion a (as shown in FIG. 10A). Accordingly, after binarization using a fixed binarization level, the boundary tends to shift inwardly as shown in FIG. 9B, in comparison with the case where the CCD line sensors 18 are correctly focused. This means that the points at which the slit width is maximized in the boundary lines between the planographic printing plate image portions and the other image portions after binarization indicate the correct boundaries of the left and right edge portions a. Therefore, even when the amplitude of vibration of the left and right edge portions a is large, the shape of the planographic printing plate 10A can be accurately measured if approximate lines L1 to L4 are drawn by extracting the points at which the slit width is maximized.

Figure 11:
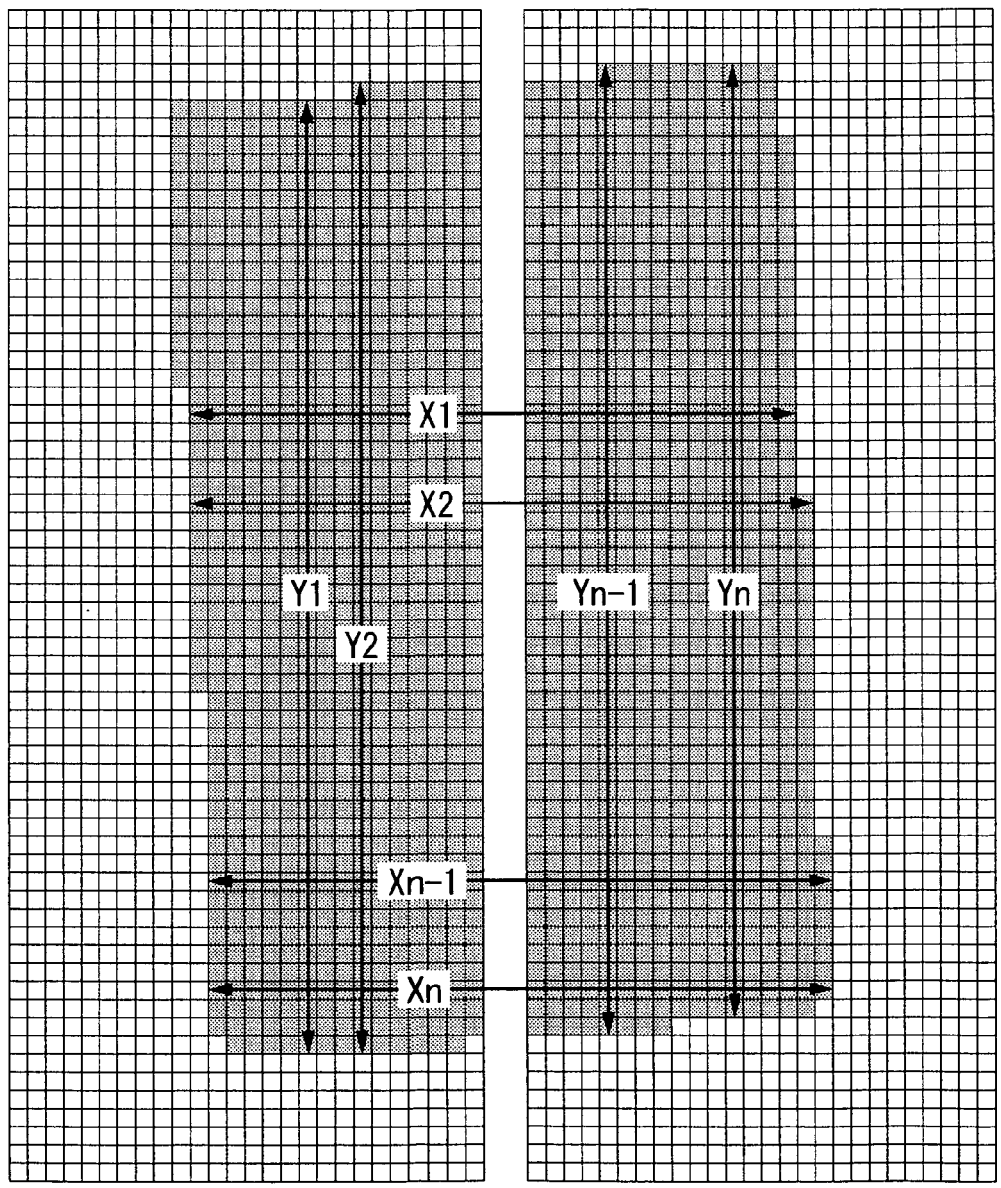
FIG. 11 is a diagram for explaining a computation method 4 for drawing approximate lines for boundary lines between the planographic printing plate image portions and the other image portions after binarization.
Figure 12:
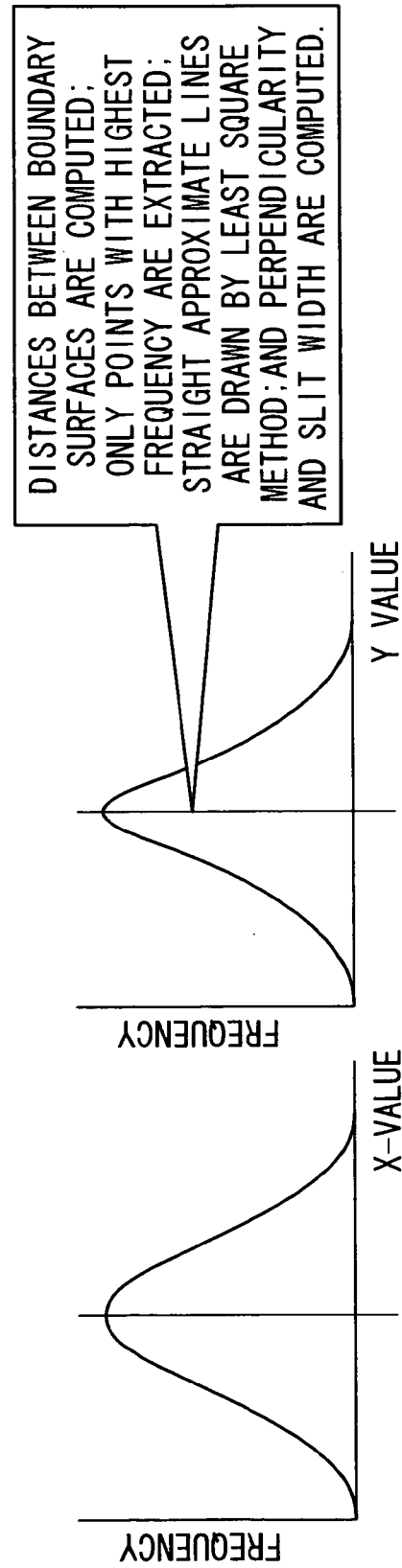
FIGS. 12A and 12B are diagrams for explaining the computation method 4.

FIG. 11 is a diagram for a fourth example of the computation method (referred to as computation method 4), in which the distances (the width and the length) between points on the planographic printing plate image portions in the binarized images obtained by continuous imaging with the two CCD line sensors 18 are computed provided that each of the slit width and the cut length is constant (i.e., the image portions are necessarily in parallelepiped form); approximate lines L1 to L4 are drawn by plotting only the points with the highest frequencies and by using the least square method; and the angles are computed from the gradients of the approximate lines L1 to L4 and the size of one pixel. That is, in this method, if the desired cut length of the planographic printing plate 10A conveyed to the sheet shape measurement apparatus 16 is ensured (i.e., the cut surfaces of the planographic printing plate 10A on the upstream side and the downstream side are parallel) and if the slit width is also constant (i.e., the slit surfaces on the opposite sides of the planographic printing plate 10A are also parallel), data on the distance in the slit width direction $(X_1, \ldots, X_n)$ and data on the distance in the cut length direction $(Y_1, \ldots, Y_n)$ are accumulated from the binarized images shown in FIG. 11, and only the distance in the slit width direction and the distance in the cut length direction corresponding to the maximum of the frequency in the histograms of FIGS. 12A and 12B are extracted to draw approximate lines L1 to L4 by the least square method.

Figure 13:
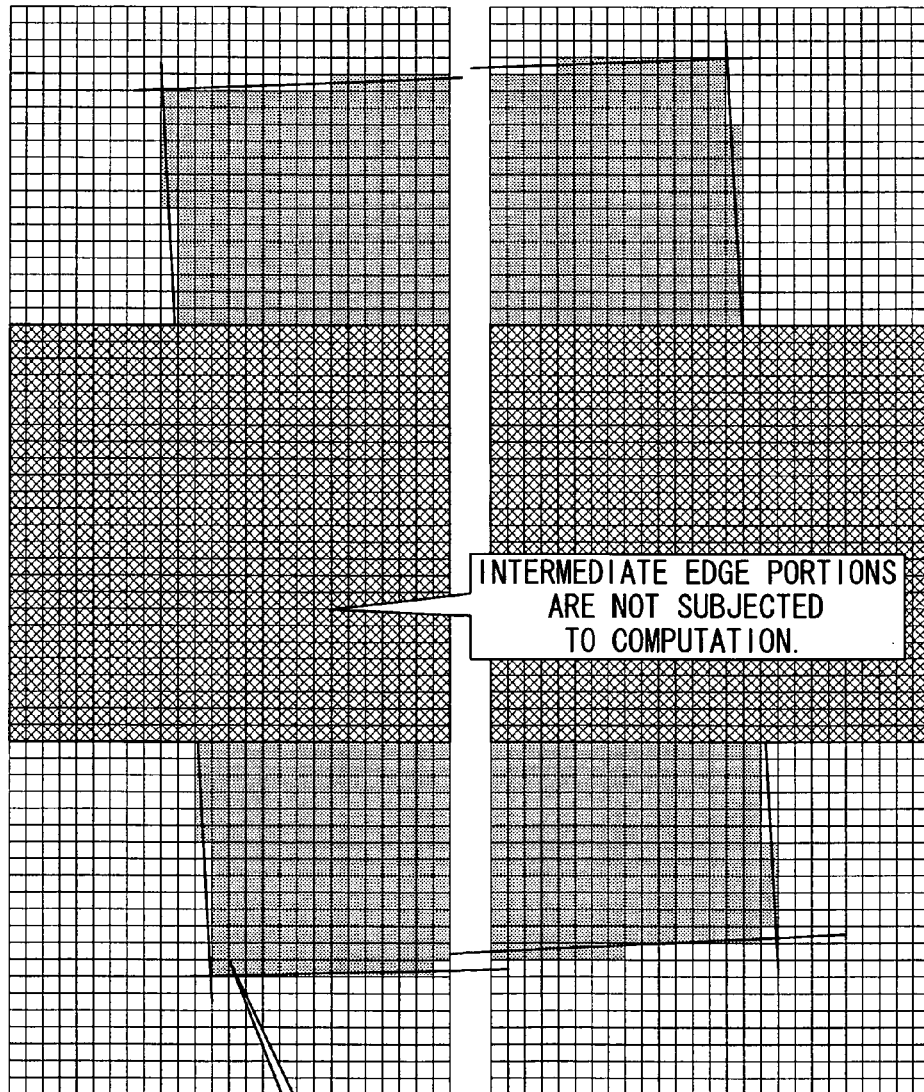
FIG. 13 is a diagram for explaining a computation method 5 for drawing approximate lines for boundary lines between the planographic printing plate image portions and the other image portions after binarization.

FIG. 13 is a diagram for a fifth example of the computation method (referred to as computation method 5), in which only the boundary ends (four corners) of the planographic printing plate 10A are subjected to the computation and correction and determination are made, provided that each of the slit width and the cut length is constant (i.e., the image portions are necessarily in parallelepiped form, of which opposite angles are equal to each other), and in which computation with respect to intermediate edge portions is avoided to make negligible the influence of meandering of the planographic printing plate 10A during inspection.

In a case where noise in the vicinity of the boundary lines between the planographic printing plate image portions and the other image portions after binarization is large, one of the above-described computation methods 1 to 5 may be carried out after removing fine noise components by additionally performing suitable image processing (filtering) to improve the measurement accuracy. For example, as shown in FIG. 14, if smoothing is performed on the binarized images, noise components before smoothing can be removed, thereby enabling approximate lines L1 to L4 to be accurately drawn. Smoothing is processing for rounding the shape. For example, one pixel is made black if five or more of the central pixel (the one pixel itself) and eight surrounding pixels are black, and one pixel is made white if only four or less of the central and eight surrounding pixels are black.

Also, the above-described filtering and some of the computation methods 1 to 5 may be performed in combination to further improve the computation accuracy.

The wavelength of the illumination devices 20 and the sensitivity characteristic of the CCD line sensors 18 for measurement can be selected according to the kind of sheets to be measured without being limited to particular values. That is, any conditions enabling the sheet image portion to be extracted while leaving the other image portion may suffice. If the planographic printing plate 10A has a photosensitive layer as in this embodiment, there is a possibility of fog. It is, therefore, preferable to use an infrared-pass filter for the illumination devices 20, which allows light with a wavelength equal to or longer than 800 nm to pass therethrough, and CCD line sensors 18 having a sensitivity in an infrared region.

While in this embodiment the sheet shape measurement apparatus 16 is arranged downstream of the flying cutter 128, it may be arranged in a different place. For example, the sheet working process for forming the planographic printing plate 10A may use a first line in which a raw web wound in coil form is fed into a working line, and worked into a sheet by being slit and cut, and a second line in which the sheet cut in the first line is further slit. If a shape measurement is carried out in the second line, the need for computing the cut length from line pulses and the binarized image can be eliminated if the value of the cut length is set in the sheet shape measurement apparatus 16 in advance, since the desired cut length is ensured in the first line. In this case, the slit width and the perpendicularity of the planographic printing plate 10A can be computed faster with accuracy.

As mentioned above, there is a problem that the CCD line sensors 18 are defocused if the left and right edge portions a vibrate at the time of measurement in the sheet shape measurement apparatus 16 of the shape of the planographic printing plate 10A conveyed by the conveyor apparatus 13. In such a case, it is preferable to provide the sheet shape measurement apparatus 16 with a guide mechanism 52 described below with reference to FIGS. 15 and 16.

Figure 15:
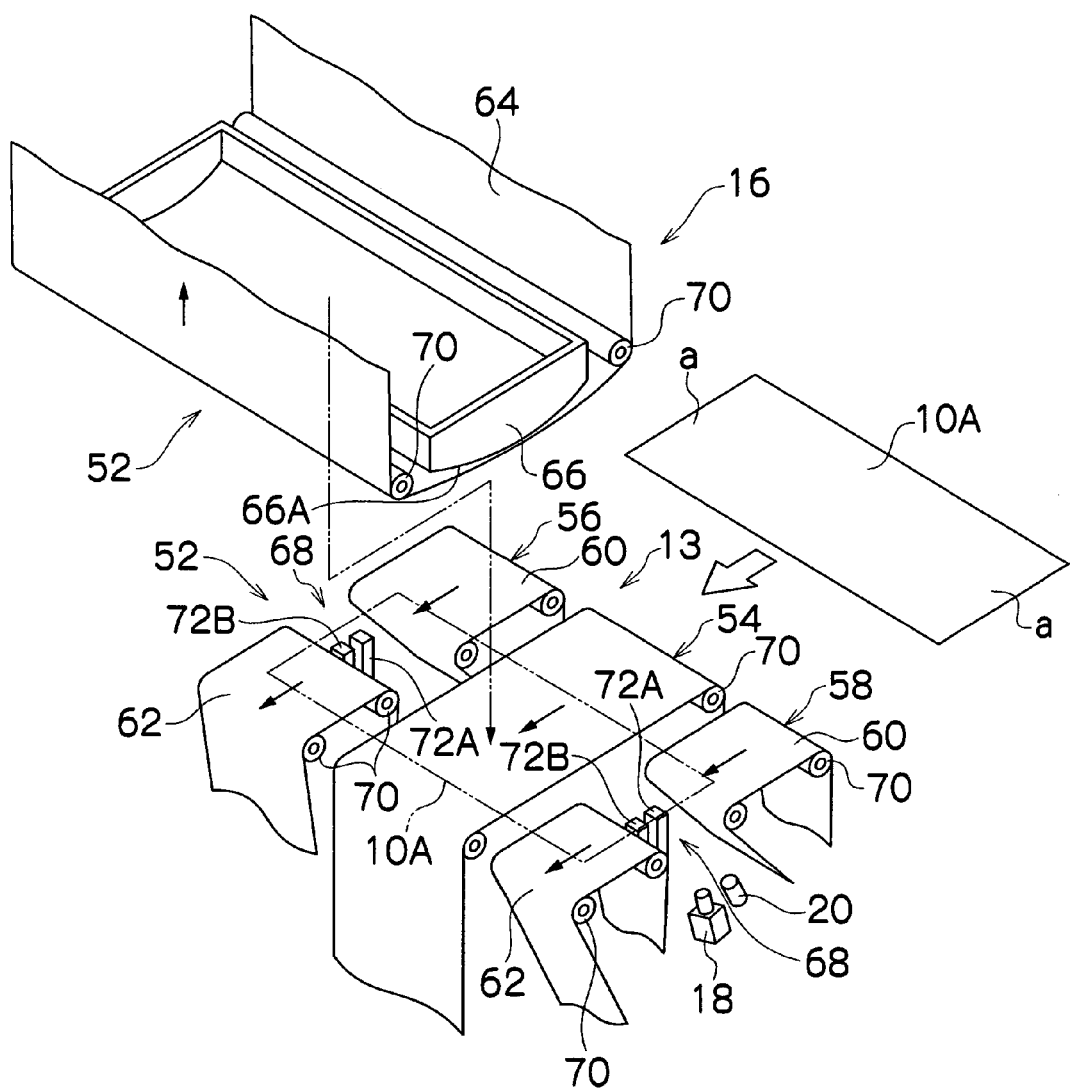
FIG. 15 is a perspective view of a conveyer apparatus and a guide mechanism.

As shown in FIG. 15, the conveyor apparatus 13 is constituted mainly by conveyors 54, 56, and 58 in three lines, i.e., a belt-type central line conveyor 54, a belt-type right line conveyor 56 (on the right-hand side of the central line conveyor 54 as seen in the forward direction), a belt-type left line conveyor 58 (on the left-hand side of the central line conveyor 54 as seen in the forward direction). Each of the right line conveyor 56 and the left line conveyor 58 is constituted by a belt-type upstream conveyor 60 and a belt-type downstream conveyor 62 spaced through a predetermined distance from each other. When the planographic printing plate 10A conveyed by the conveyors 54, 56, and 58 in three lines is transferred from the upstream conveyor 60 to the downstream conveyor 62, the left and right edge portions a of the planographic printing plate 10A are continuously imaged with the pair of CCD line sensors 18. Preferably, in this case, the line speed in measurement of the shape of the planographic printing plate 10A is in the range from 40 m/minute to 150 m/minute.

The guide mechanism 52 mainly comprises: a moving belt 64, which supports the photosensitive layer surface of the planographic printing plate 10A and which moves in the same direction as the direction of conveyance of the planographic printing plate 10A by the conveyor apparatus 13 and at the same speed as the speed of this conveyance; a backing member 66, which is arranged on the side of the moving belt 64 opposite from the planographic printing plate 10A by being opposed to the CCD line sensors 18, the backing member 66 having a pressure receiving surface 66A, which has a high degree of flatness and is free from surface irregularities and curved along the direction of movement of the moving belt 64; and pressure application devices 68 for pressing the planographic printing plate 10A against the pressure receiving surface 66A through the medium of the moving belt 64 by flowing gas to the surface of the planographic printing plate 10A opposite from the photosensitive layer so that a non-contact gas pressure is applied to the planographic printing plate 10A. The backing member 66 is formed as a fixed member, and the moving belt 64 moves while sliding on the pressure receiving surface 66A of the backing member 66. The belt conveyor has path rollers 70. Air is ordinarily used as the gas. However, an inert gas such as nitrogen gas may also be used.

Figure 16:
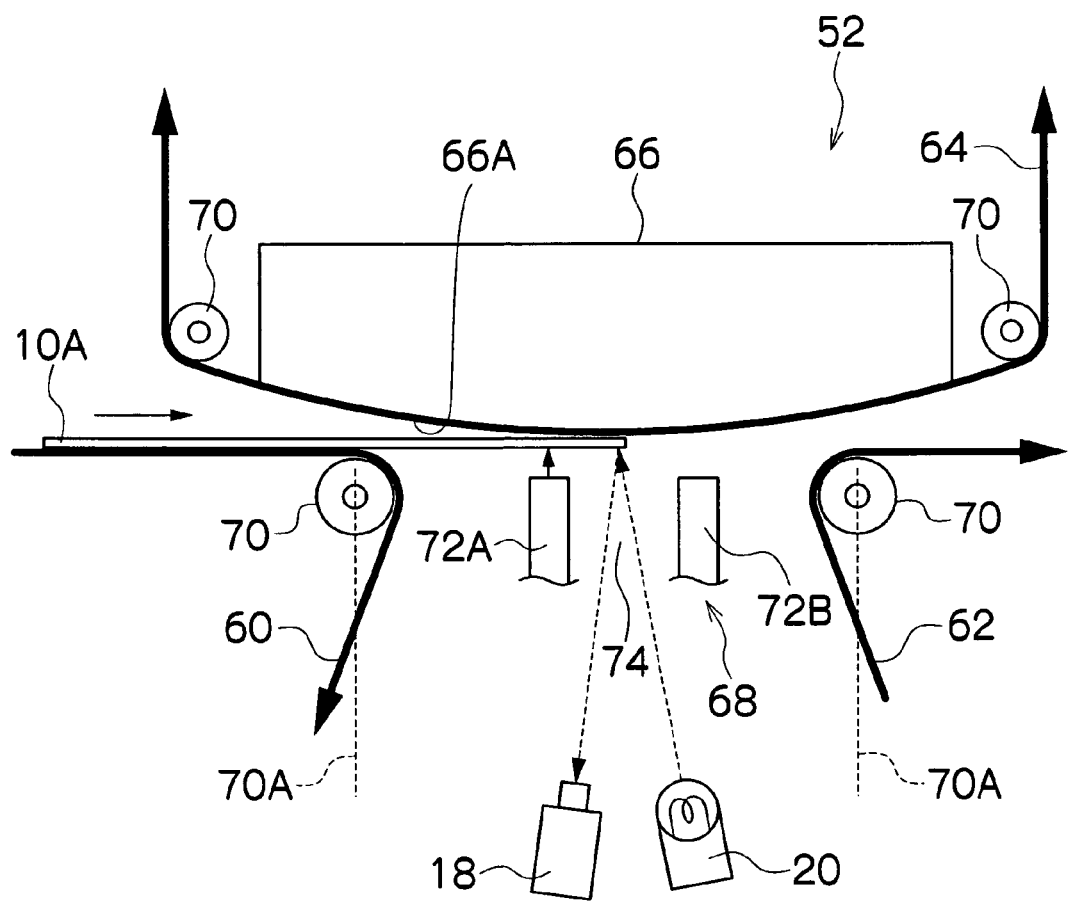
FIG. 16 is a schematic sectional side view mainly showing the guide mechanism.

The pressure application devices 68 include a pair of nozzles 72A and 72B, through which the gas is blown toward the pressure receiving surface 66A of the backing member 66, and which are disposed in upstream and downstream positions in the direction of conveyance of the planographic printing plate 10A with a spacing 74 provided therebetween, as shown in FIG. 16. Through the spacing 74, illumination light is emitted from the illumination device 20 toward the planographic printing plate 10A. Reflected light from the planographic printing plate 10A passes through the spacing 74 to be received by the CCD line sensor 18. The pair of nozzles 72A and 72B are provided in correspondence with each of the left and right edge portions a of the planographic printing plate 10A (see FIG. 15), and the pressure application devices 68 includes four nozzles in total.

When the planographic printing plate 10A is transferred from the upstream conveyor 60 to the downstream conveyor 62, the gas is first blown off from the upstream nozzle 72A in each pair of nozzles 72A and 72B to press a leading end portion of the planographic printing plate 10A against the backing member 66 through the medium of the moving belt 64. Subsequently, when the leading end of the planographic printing plate 10A reaches a position corresponding to a center line 70A of the path roller 70 of the downstream conveyor 62 (see FIG. 16), the gas is also blown off from the nozzle 72B. Thus, the gas blown from the nozzle 72B is prevented from entering the gap between the leading end of the planographic printing plate 10A and the moving belt 64 and causing the planographic printing plate 10A to flutter. When the trailing end of the planographic printing plate 10A moves apart from the position corresponding to the center line 70A of the path roller 70 of the upstream conveyor 60, blowing of the gas from the nozzle 72A is stopped. Thus, the gas blown from the nozzle 72A is prevented from entering the gap between the trailing end of the planographic printing plate 10A and the moving belt 64 and causing the planographic printing plate 10A to flutter. Preferably, the pressure of the gas blown off from the nozzles 72A and 72B is in the range from 0.05 MPa to 0.3 MPa and the distance between the nozzle openings of the nozzles 72A and 72B and the planographic printing plate 10A is in the range from 1 mm to 10 mm. It is preferable to generate, during online measurement in particular, a gas pressure high enough to press the planographic printing plate 10A against the pressure receiving surface 66A of the backing member 66 by causing the planographic printing plate 10A to float by the pressure of the gas blown off from the nozzles 72A and 72B (so as not to be in contact with the transport mechanisms 54, 56, and 58). Although settings for moving the moving belt 64 in the same direction as the direction of conveyance by the conveyor apparatus 13 and at the same speed as the speed of this conveyance are made, there is a risk of the planographic printing plate 10A being scratched unless the speeds of the moving belt 64 and the conveyor apparatus 13 are completely synchronized. This risk can be reliably avoided by causing the planographic printing plate 10A to float. In the floating state, the planographic printing plate 10A moves in synchronization with the movement of the moving belt 64 while being supported by the gas pressure.

In the above description, avoidance of computation of the coordinates of intermediate edge portions for making the influence of meandering of planographic printing plate 10A negligible has been proposed with reference to FIG. 13. Also, drawing of approximate lines L1 to L4 while extracting points at which the slit width is maximized has been proposed as a measure to cope with vibration (flutter) of the planographic printing plate 10A with reference to FIG. 8. Further, the sheet shape measurement apparatus 16 having the guide mechanism 52 has been proposed as a measure to cope with vibration (flutter) of the planographic printing plate 10A with reference to FIGS. 15 and 16.

In the following description, measures in other cases such as a case where corner portions of the planographic printing plate 10A for example float due to curl, flutter or the like of the planographic printing plate 10A while the planographic printing plate 10A is being transported during online measurement on the planographic printing plate 10A, and a case where the meandering states of the leading and trailing ends of the planographic printing plate 10A depending on the placement of the conveyor apparatus 13, a meandering habit of the conveyor belt, etc., differ from each other during online measurement on the planographic printing plate 10A, will be described as a further improvement for making the influence of such meandering, vibration or the like negligible.

A method of making an accurate sheet shape measurement no matter what the accuracy with which the image pickup device, i.e., the CCD line sensors 18, is mounted will also be described.

(a) A measure in a case where corner portions of the planographic printing plate 10A float when curl, flutter or the like of the planographic printing plate 10A occurs in addition meandering (change in attitude) during measurement.

In many cases of actual image pickup of corner portions of the planographic printing plate 10A with the CCD line sensors 18 during conveyance by the conveyor apparatus 13, images of the corner portions cannot be obtained with stability because of flutter or curl of the planographic printing plate 10A. In such cases, images of the four corner portions of the planographic printing plate 10A imaged with the CCD line sensors 18 are clipped or contain noise portions, as shown in FIG. 17.

A measure to cope with this problem is a method in which a measure against floating based on avoidance of use of the boundary ends, i.e., the four corners of the planographic printing plate 10A, in computation is added to the measure against meandering based on avoidance of computation of the coordinates of intermediate edge portions for making the influence of meandering of the planographic printing plate 10A negligible, which has been described with reference to FIG. 13.

This method will be described more concretely with reference to FIG. 17. The distance between coordinates assumed to represent the four corner points of the planographic printing plate 10A and a coordinate region R not used for computation according to the measure against meandering, i.e., the number of coordinate points (the number of pixels) usable in computation, is set to a certain number. Further, a certain number of points from the corner points not used in computation according to the measure against floating is set. In this case, the number of points not used in computation is set by the operator with respect to each of the four corners according to the extent of floating of the corner. Accordingly, the number of coordinate points at the four corners to be left out may be equal or different from each other.

Figure 17:
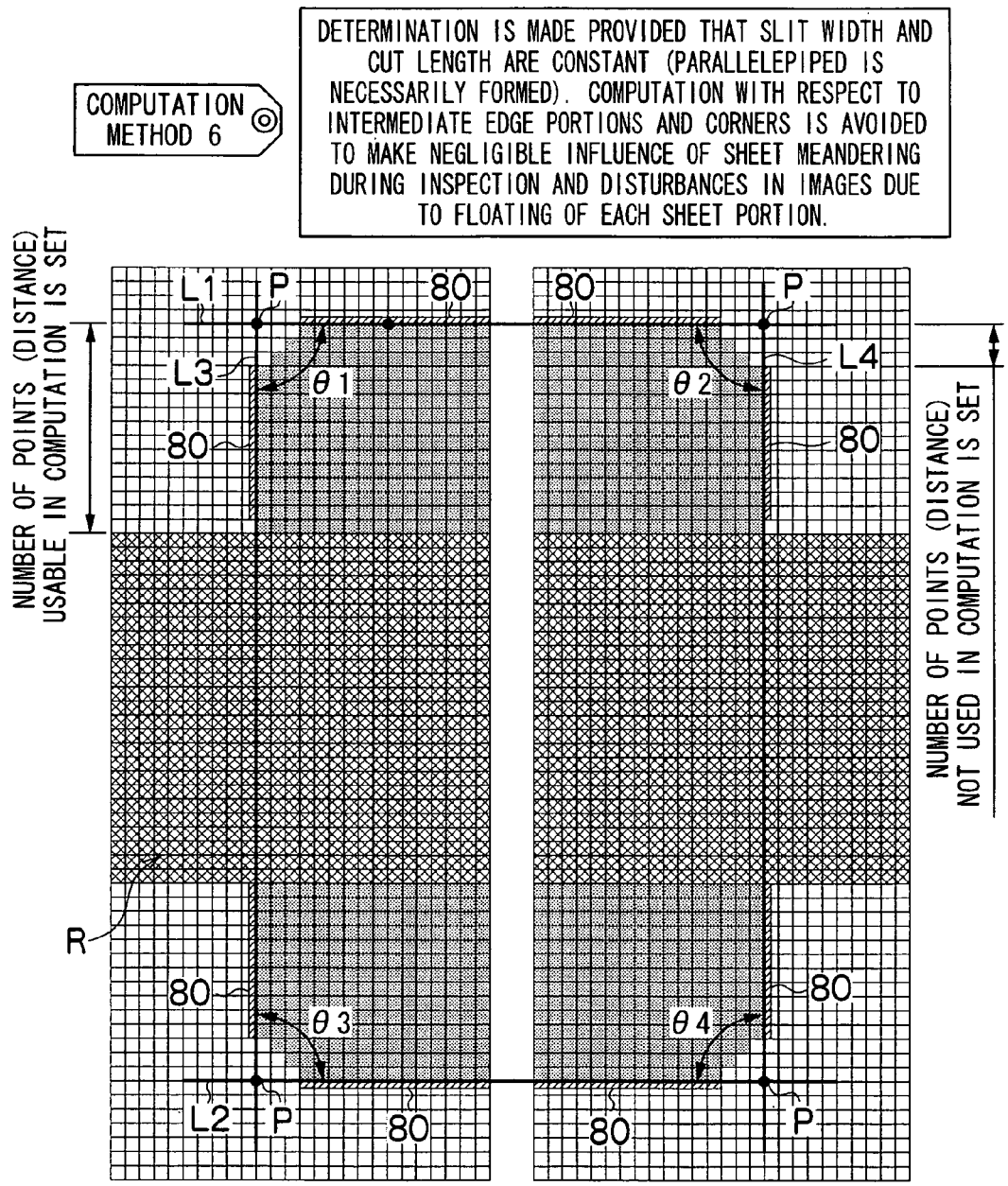
FIG. 17 is a diagram for explaining a measure in a case where floating of corner portions of the planographic printing plate due to curl, flutter or the like occurs during measurement as well as meandering (change in attitude)

Only the coordinates in regions defined by subtracting the number of coordinate points not used in computation from the number of coordinate points usable in computation and indicated in hatched areas 80 representing straights in FIG. 17 are finally used in computation. Approximate lines L1 to L4 are drawn by the least square method using the straight lines 80, and the points of intersection of the approximate lines L1 to L4 are assumed to be the true corner points P in the state where no flutter or curl occurs. P' in FIG. 18 indicates a corner point when a computation region straight line 80b can appear. Since the above-described straight line 80 is a straight line indicating a coordinate region finally used in computation, it will be referred to as "computation region straight line 80". Angles (θ1 to θ4) are computed from the gradients of the approximate lines L1 to L4 obtained as described above and the size of one pixel, thereby obtaining the shape of the planographic printing plate 10A. Thus, both the measure against meandering and the measure against floating can be taken to improve the measurement accuracy.

Figure 18:
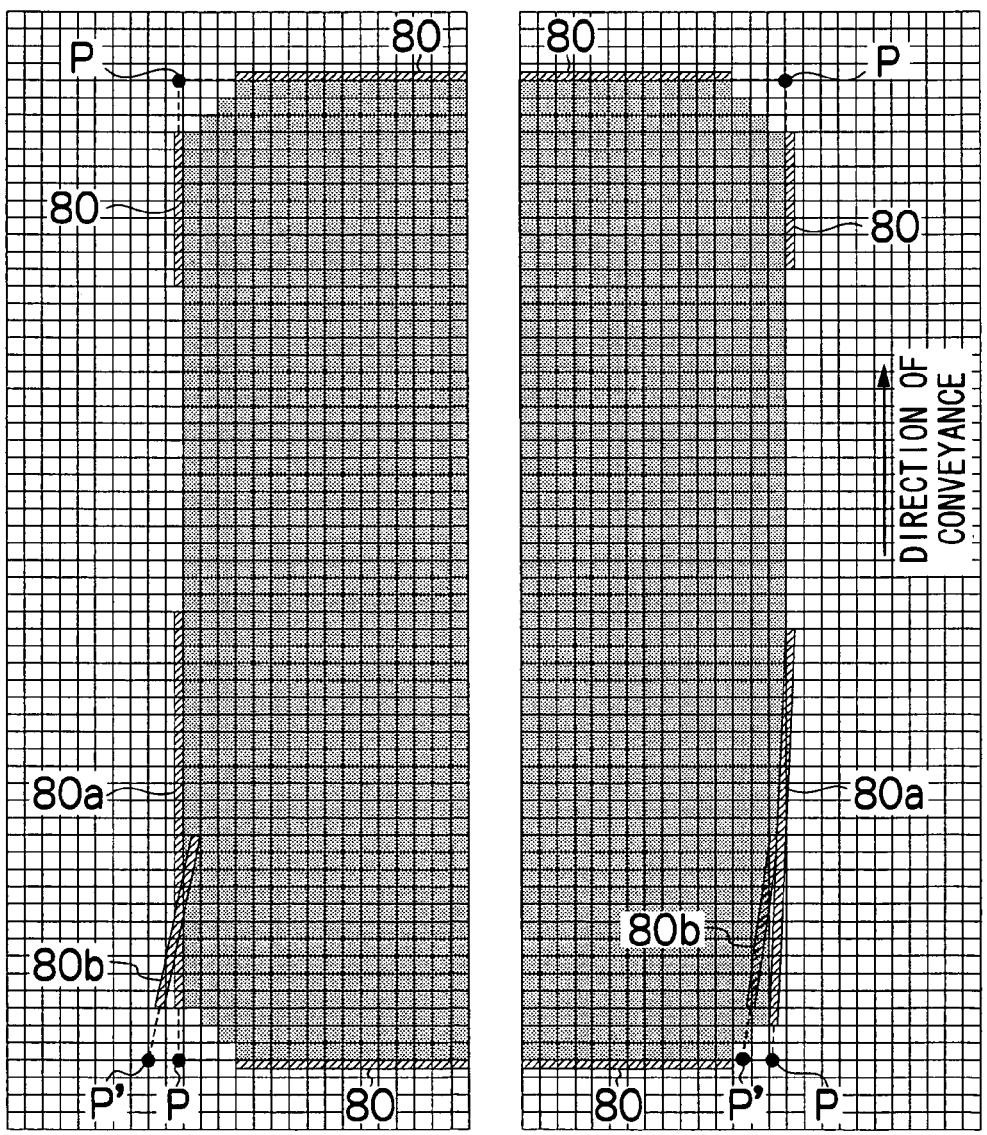
FIG. 18 is a diagram for explaining a measure in a case where the meandering states of the leading and trailing ends of the planographic printing plate differ from each other.

However, there is a possibility of the meandering states of the leading and trailing ends of the planographic printing plate 10A differing from each other during measurement depending on the placement of the conveyor apparatus 13, a running habit of the conveyor belt, etc. For example, in some case, the planographic printing plate 10A conveyed by the conveyor apparatus 13 is stable in attitude without meandering when measured at its leading end side with the CCD line sensors 18, but it meanders at all times when measured at its trailing end side, as shown in FIG. 18. In such a case, the computation region straight line 80 to be used in computation at the trailing end side of the planographic printing plate 10A and to be imaged as a computation region straight line 80a in alignment with the computation region straight line 80 at the leading end side if no meandering is caused is imaged as a computation region straight line 80b in an inclined state due to meandering. The gradients of the coordinate portions of the computation region straight line 80 used in computation are thereby made different between the leading-end and trailing-end sides of the planographic printing plate 10A, and the approximate lines cannot be correctly drawn. This is a cause of a measurement error.

As a measure to cope with this problem, the length of the computation region straight line 80 is made changeable between the leading and trailing ends of the planographic printing plate 10A to reduce the influence of the change in meandering state between the leading and trailing ends. That is, as shown in FIG. 18, the computation region straight line 80 at the leading end side of the planographic printing plate 10A is formed as a short straight line such as shown in FIG. 17 for example. On the other hand, the computation region straight line 80a longer than the computation region straight line 80 shown in FIG. 17 is used at the trailing end side of the planographic printing plate 10A at which the planographic printing plate 10A meanders and the attitude of the planographic printing plate 10A is unstable, because if the shorter computation region straight line 80 is used the influence of meandering is strongly reflected in the computation result. Thus, the longer computation region straight line 80a including the coordinate regions at which no meandering is caused is formed at the trailing end side of the planographic printing plate 10A, thereby limiting the reduction in measurement accuracy due to meandering of the planographic printing plate at the trailing end side. The same concept applies to limitation of the reduction in measurement accuracy in the case where the planographic printing plate 10A meanders at the leading end side but does not meander at the trailing end side.

It is also preferable to use a method of making an improvement described below to the conveyor apparatus 13 in which meandering of the planographic printing plate 10A can occur easily.

That is, if imaging of the planographic printing plate 10A with the CCD line sensors 18 is performed at one position in the direction of conveyance of the planographic printing plate 10A, it is possible that the planographic printing plate 10A will be imaged in a non-meandering state at the leading end and in a meandering state at the trailing end due to the time difference between imaging at the leading end and imaging at the trailing end. In such a case, the influence of meandering on the measurement accuracy is large. As a measure to minimize the influence of meandering in such a case, a sheet shape measurement apparatus 16' described below may be provided.

Figure 19A:
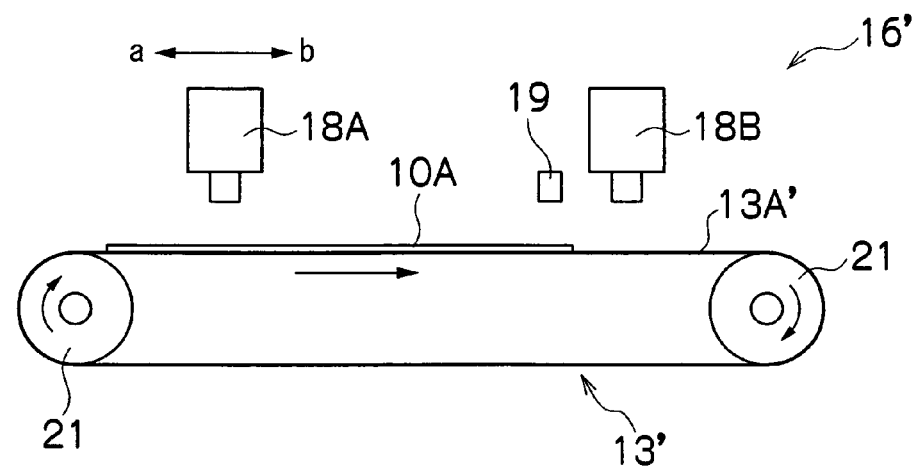
FIGS. 19A and 19B are diagrams showing a sheet shape measurement apparatus having means provided as measures to cope with the problem that the conveyor apparatus is liable to meander.
Figure 19B:
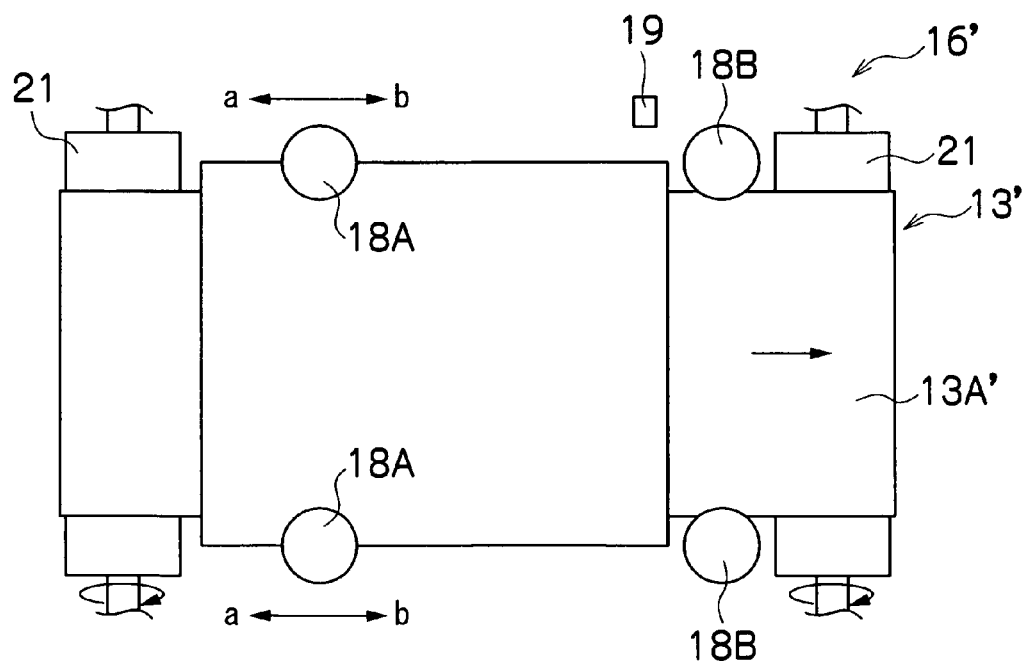

FIGS. 19A and 19B show an example of the sheet shape measurement apparatus 16' in a case where CCD line sensors 18A and 18B are disposed at two positions in the direction of conveyance of the planographic printing plate 10A. FIG. 19A is a schematic side view of the sheet shape measurement apparatus 16', and FIG. 19B is a schematic top view of the sheet shape measurement apparatus 16'. As an example of CCD line sensors 18 in the apparatus in FIGS. 19A and 19B, reflection-type CCD line sensors 18 are illustrated. However, transmission-type CCD line sensors 18 may alternatively be used.

As shown in FIGS. 19A and 19B, the planographic printing plate 10A is conveyed on an endless belt 13A' supported on a pair of rollers 21 of a conveyor apparatus 13'. The CCD line sensors 18 are arranged above the conveyor apparatus 13' at two positions in the direction of conveyance of the planographic printing plate 10A and in a region corresponding to the cut length of the planographic printing plate 10A. In the example shown in FIGS. 19A and 19B, a pair of upstream CCD line sensors 18A are provided on the upstream side in the direction of conveyance of the planographic printing plate 10A, and a pair of downstream CCD line sensors 18B are provided on the downstream side. That is, the two pairs of CCD line sensors on the upstream and downstream sides, i.e., a total of four CCD line sensors 18A and 18B, are provided to image only edge portions of the planographic printing plate 10A. If the width (slit width) of the planographic printing plate 10A is small, only two CCD line sensors 18 each capable of imaging the planographic printing plate 10A through the entire slit width may be respectively disposed on the upstream and downstream sides.

At least one of the upstream pair of CCD line sensors 18A and the downstream pair of CCD line sensors 18B are supported on a moving mechanism (not shown) capable of moving in an a–b direction along the direction of conveyance of the planographic printing plate 10A. FIGS. 19A and 19B show a case where the upstream CCD line sensors 18A are movable in the a–b direction. By this moving mechanism, the distance by which the upstream and downstream CCD line sensors 18A and 18B are spaced apart from each other is adjusted according to the cut length of the planographic printing plate 10A so that leading end portion and trailing end portion of the planographic printing plate 10A are imaged simultaneously with each other. Any moving mechanism may suffice as the above-described moving mechanism if it is capable of moving with accuracy, and no further description will be made of it.

A sensor 19 for sensing passage of the leading end of the planographic printing plate 10A for timing of arrival at the downstream CCD line sensors 18 is provided in the vicinity of the downstream CCD line sensors 18.

By sensing passage of the leading end of the planographic printing plate 10A with the sensor 19, the planographic printing plate 10A is imaged simultaneously at the leading end side and the trailing end side with the upstream and downstream CCD line sensors 18A and 18B, thus making an online measurement on the shape of the planographic printing plate 10A without any influence of meandering.

While CCD line sensors 18A and 18B are disposed at two positions on the upstream and downstream sides in the arrangement shown in FIGS. 19A and 19B, the number of times the planographic printing plate 10A is imaged at the leading and trailing ends may be increased by disposing CCD line sensors 18 at three or more positions. In this way, the reliability of measured values can be further improved.

(b) A method of making an accurate sheet shape measurement no matter what the accuracy with which the image pickup device, i.e., the CCD line sensors 18, is mounted.

Figure 20:
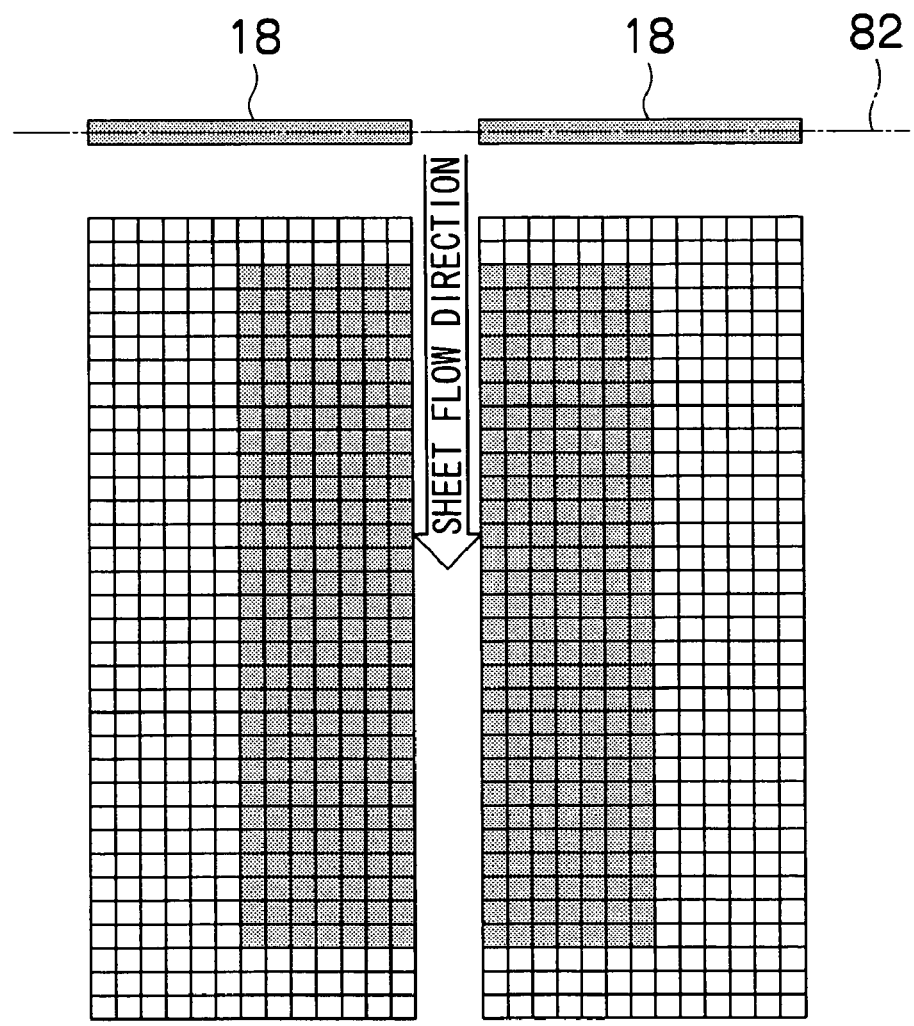
FIG. 20 is a diagram for explaining a method for making a sheet shape measurement with accuracy no matter what the CCD line sensor mount accuracy with respect to a case where there is no relative shift between the placements of a pair of CCD line sensors.

FIG. 20 shows a case where a pair of CCD line sensors 18 for imaging left and right edge portions a (see FIGS. 2 and 3) of the planographic printing plate 10A are disposed along a straight reference line 82 perpendicular to the direction of conveyance of the planographic printing plate 10A (sheet flow direction), that is, a case where a pair of CCD line sensors 18 are mounted in an ideal state by being mounted with highest accuracy without any error in positioning. In this case, in images obtained by the CCD line sensors 18, the shape of the planographic printing plate 10A is correctly imaged, as shown in FIG. 20.

Figure 21:
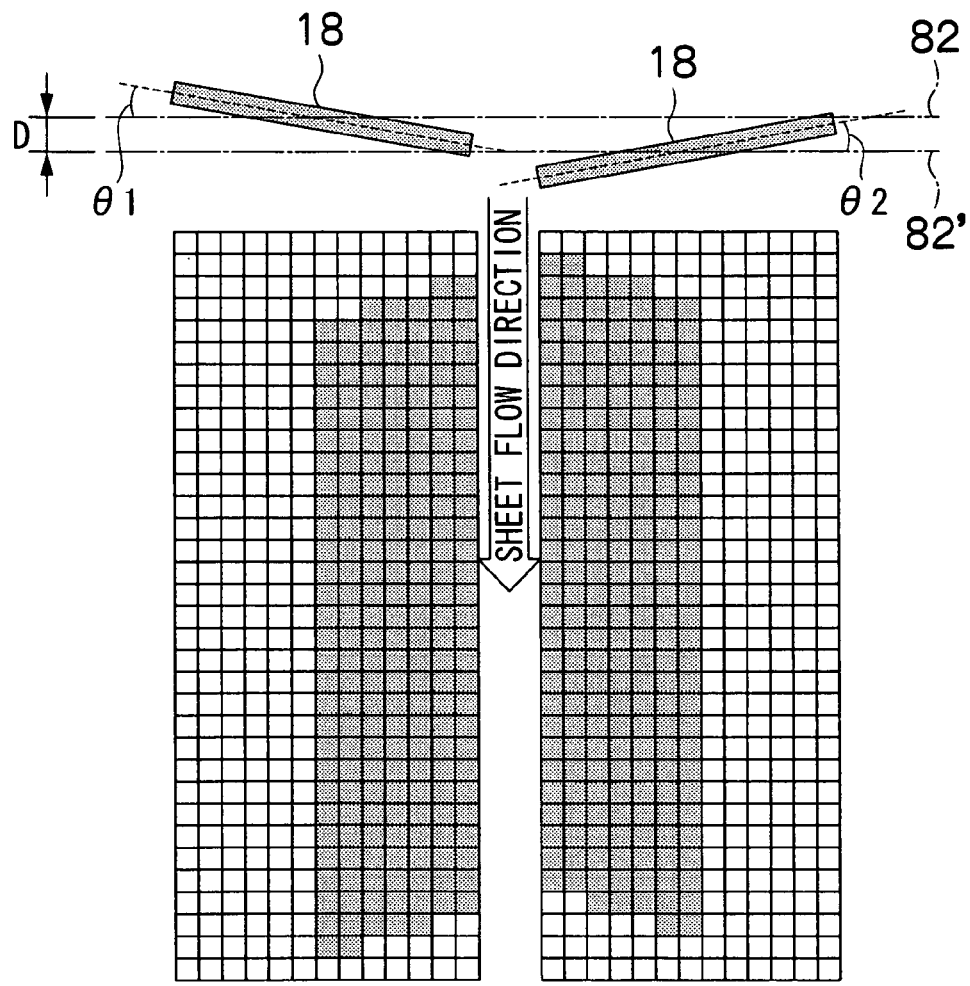
FIG. 21 is a diagram for explaining a method for making a sheet shape measurement with accuracy no matter what the CCD line sensor mount accuracy with respect to a case where there is a relative shift between the placements of the pair of CCD line sensors.

However, it is extremely difficult to mount the pair of line sensors having an array of 1000 or more CCD elements for forming pixels each having a size of about 10 μm×10 μm in the grid pattern shown in FIG. 20, by disposing them in alignment with each other while spacing them by a certain distance apart from each other. Even if the CCD line sensors 18 can be correctly mounted, the cost for mounting is considerably high. If the pair of CCD line sensors 18 are respectively shifted by angles of θ1 and θ2 from the straight reference line 82 as shown in FIG. 21 without being aligned with each other on the reference line 82, or if a shift of the position of the CCD line sensors 18 by a distance D in the direction of conveyance of the planographic printing plate 10A occurs, the shape of the planographic printing plate 10A cannot be correctly imaged. A straight line 82' in FIG. 21 represents another straight reference line when one of the CCD line sensors 18 is shifted by the distance D from the straight reference line 82. That is, even if the planographic printing plate 10A is correctly conveyed with respect to the CCD line sensors 18, a slight error occurs in timing of imaging along the widthwise direction of the planographic printing plate 10A, resulting in occurrence of shifts of the leading end and trailing end images of the planographic printing plate 10A corresponding to the above-described shifts by θ1 and θ2 and D, as shown in FIG. 21.

As a method for eliminating errors in influencing method of correcting errors in positioning of the pair of CCD line sensors 18 in mechanical mounting, a method of correcting obtained images by means of a piece of software can be effectively used. That is, θ1 (the amount of angular shift of one of the CCD line sensors 18), θ2 (the amount of angular shift of the other CCD line sensor 18) and D (the amounts of shift of the positions of the pair of CCD line sensors 18) are measured and the shape of the planographic printing plate is computed by making compensation for the measured θ1, θ2 and D. In this manner, correct images can be obtained by making compensation by suitable amounts of compensation even if the pair of CCD line sensors 18 are disposed in shifted states without being aligned on the straight reference line 82.

As a method for grasping the amounts of angular shift and position shift of the pair of CCD line sensors 18, a method described below is preferably used.

That is, a calibration sheet on which square meshes uniform in line width are arrayed in grid from is conveyed at a speed low enough to prevent meandering and is imaged with the pair of CCD line sensors 18. The width of lines forming the grid meshes is preferably about 20 μm to 100 μm, and one side of each mesh is preferably within the range from 2 mm to 10 mm.

Subsequently, determination is made from the obtained image of the calibration sheet as to whether or not there is any relative shift between the placements of the pair of CCD line sensors 18 (angular shift, position shift). That is, if there is no placement shift between the pair of CCD line sensors 18, one straight line on the calibration sheet imaged with one of the CCD line sensors 18 exists in the production of the corresponding straight line on the calibration sheet imaged with the other CCD line sensor 18. If there is a placement shift between the pair of CCD line sensors 18, one straight line on the calibration sheet imaged with one of the CCD line sensors 18 has a position shift or an angular shift relative to the corresponding straight line on the calibration sheet imaged with the other CCD line sensor 18. The amount of angular shift or position shift between the pair of CCD line sensors 18 can be easily computed by computing the position shift or angular shift in terms of the number of meshes in the grid indicated on the calibration sheet. For example, in a case where one straight line imaged with one of the CCD line sensors 18 is imaged in a state of being inclined relative to the corresponding straight line imaged with the other CCD line sensor 18 with a shift corresponding to three meshes therefrom without being aligned therewith, this three-mesh shift corresponds to the angular shift between the pair of CCD line sensors 18. In a case where one straight line imaged with one of the CCD line sensors 18 is shifted from the corresponding straight line imaged with the other CCD line sensor 18 by the amount corresponding to one mesh in the direction of conveyance of the planographic printing plate 10A, this one-mesh shift corresponds to the position shift. If the sheet shape of the planographic printing plate is computed by making compensation for the computed angular shift or position shift, the measurement accuracy can be improved.

While the embodiments of the present invention have been described with respect to a case where the planographic printing plate 10A is provided as a sheet to be measured. However, the present invention is not limited to this. The present invention can also be applied to a thin iron plate, a resin sheet, etc.

Description will next be made of preferred forms of the planographic printing plate 10A in the embodiments of the present invention.

The planographic printing plate 10A is formed by applying a coating film (a photosensitive layer in the case of a photosensitive printing plate or a thermosensitive layer in the case of a thermosensitive printing plate, and, if necessary, an overcoat layer, a matte layer or the like) on a supporting member in the form of a rectangular thin plate made of aluminum. Plate making processings such as development processing and gum coating are performed on the coating film. The planographic printing plate 10A thus formed is set in a printing machine and ink is applied to the printing plate to print characters, images and the like on sheets of paper.

The planographic printing plate 10 in the present embodiments is a plate at a stage before the processing steps (such as exposure and development) necessary for printing. In some case, the planographic printing plate 10A is referred to as a planographic printing original plate or a planographic printing plate material. The planographic printing plate 10A is not limited to any particular concrete form, if it is formed as described above. For example, the planographic printing plate 10A may be formed as a printing plate for a heat-mode or photon-type laser printing, i.e., a printing plate capable of being directly formed from digital data.

Also, the planographic printing plate 10A can be formed as any of planographic printing plates corresponding to various plate making methods by selecting from various materials for use as components of a photosensitive layer or a thermosensitive layer. The following are concrete examples (1) to (11) of the form of the planographic printing plate 10A in the present embodiments:

(1) A form in which a photosensitive layer contains an infrared absorber, a compound capable of generating an acid by heat, and a compound capable of crosslinking by the acid;

(2) A form in which a photosensitive layer contains an infrared absorbing agent, and a compound capable of becoming alkali-soluble by heat;

(3) A form in which a photosensitive layer includes a layer containing a compound capable of generating a radical by irradiation with laser light, an alkali-soluble binder, and a polyfunctional monomer or prepolymer, and an oxygen blocking layer;

(4) A form in which a photosensitive layer is formed of two layers: a physically developable nucleus layer and a silver halide emulsion layer;

(5) A form in which a photosensitive layer includes three layers: a polymerization layer containing a polyfunctional monomer and a polyfunctional binder, a layer containing silver halide and a reducer, and an oxygen blocking layer;

(6) A form in which a photosensitive layer includes two layers: a layer containing a novolak resin and naphthoquinonediazido, and a layer containing silver halide;

(7) A form in which a photosensitive layer contains an organic photoconductor;

(8) A form in which a photosensitive layer includes two or three layers: a laser light absorbing layer capable of being removed by irradiation with laser light and an oleophilic layer and/or hydrophilic layer;

(9) A form in which a photosensitive layer contains a compound capable of absorbing energy to generate an acid, a high polymer compound having in a side chain a functional group capable of generating sulfonic acid or carboxylic acid, and a compound capable of absorbing visible light to give energy to the acid generator;

(10) A form in which a photosensitive layer contains a quinonediazido compound and a novolak resin; and

(11) A form in which a photosensitive layer contains a compound capable of being decomposed by light or ultraviolet rays to form a crosslinked structure by itself or with other molecules in the layer, and an alkali-soluble binder.

In particular, in a case where the planographic printing plate 10A has a photosensitive layer (or thermosensitive layer) the solubility of which in a developer solution is changed by irradiation with laser light, the image forming surface (photosensitive layer or thermosensitive layer) is susceptible to damage. An application of the present invention in such a case is preferable because film separation can be prevented with reliability, as described below.

The wavelength of laser light referred to herein is not limited to any particular wavelength. Examples of laser light usable in the above-described cases are (A) laser light in a 350 nm to 450 nm wavelength range (e.g., light from a laser diode with a wavelength of 405±5 nm), (B) laser light in a 480 nm to 540 nm wavelength range (e.g., light from an argon laser with a wavelength of 488 nm, light from a (FD) YAG laser with a wavelength of 532 nm, light from a solid-state laser with a wavelength of 532 nm, light from a (green) He—Ne laser with a wavelength of 532 nm), (C) laser light in a 630 nm to 680 nm wavelength range (e.g., light from a He—Ne laser with a wavelength of 630 nm to 670 nm, light from a red semiconductor laser with a wavelength of 630 nm to 670 nm), (D) laser light in a 800 nm to 830 nm wavelength range (e.g., light from an infrared (semiconductor) laser with a wavelength of 830 nm), and (E) laser light in a 1064 nm to 1080 nm wavelength range (e.g., light from a YAG laser with a wavelength of 1064 nm). Of these examples, each of laser light in the wavelength range shown in (B) and laser light in the wavelength range shown in (C) can be used for the planographic printing plate 10A having the photosensitive or thermosensitive layer in the above-described form (3) or (4). Also, each of laser light in the wavelength range shown in (D) and laser light in the wavelength range shown in (E) can be used for the planographic printing plate 10A having the photosensitive or thermosensitive layer in the above-described form (1) or (2). Needless to say, the relationship between the wavelength range of laser light and the photosensitive or thermosensitive layer is not limited to these.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method of making an online measurement of a shape of a conveyed sheet, the method comprising:
   disposing a plurality of CCD line sensors in the direction of conveyance of the conveyed sheet to continuously image the conveyed sheet;
   simultaneously imaging a leading end and a trailing end of the conveyed sheet;
   continuously imaging along entire lengths of at least two edge portions of the conveyed sheet in a direction of conveyance of the conveyed sheet, beginning at the leading end of the conveyed sheet and continuing to the trailing end of the conveyed sheet, the imaging being performed by the CCD line sensors;
   processing an image obtained in the imaging step to extract a sheet image portion corresponding to the conveyed sheet in the obtained image; and
   obtaining a shape of the conveyed sheet according to the sheet image portion extracted in the processing step.

2. The method as defined in claim 1, further comprising:
   continuously imaging only along the entire lengths of the two edge portions of the conveyed sheet in the direction of conveyance with a pair of CCD line sensors positioned in correspondence with the two edge portions in the imaging step; wherein a distance by which the pair of the CCD line sensors positioned in correspondence with the two edge portions are spaced apart from each other is reflected in a computation for obtaining the shape of the conveyed sheet.

3. The method as defined in claim 1, wherein a portion in the extracted sheet image portion corresponding to a portion of the conveyed sheet at which meandering or floating of the conveyed sheet has occurred is excluded from a computation for obtaining the shape of the conveyed sheet.

4. The method as defined in claim 2, wherein a portion in the extracted sheet image portion corresponding to a portion of the conveyed sheet at which meandering or floating of the conveyed sheet has occurred is excluded from the computation for obtaining the shape of the conveyed sheet.

5. The method as defined in claim 1, wherein:
   disposing a pair of CCD line sensors for measuring along the entire lengths of the two edge portions of the conveyed sheet at left and right positions in a widthwise direction of the conveyed sheet;
   conveying a calibration sheet on which square meshes uniform in line width are arrayed in grid form at a speed that is low enough to prevent meandering and imaging the calibration sheet with the pair of CCD line sensors;
   determining from images of the calibration sheet obtained by the imaging as to whether or not there is any relative shift between placements of the pair of CCD line sensors; and
   if there is a relative shift between the placements of the pair of CCD line sensors, computing the shape of the conveyed sheet by compensating for the relative shift in the placements.

6. The method as defined in claim 2, wherein:
   disposing a pair of CCD line sensors for measuring along the entire lengths of the two edge portions of the conveyed sheet at left and right positions in a widthwise direction of the conveyed sheet;
   conveying a calibration sheet on which square meshes uniform in line width are arrayed in grid form at a speed that is low enough to prevent meandering and imaging the calibration sheet with the pair of CCD line sensors;
   determining from images of the calibration sheet obtained by the imaging as to whether or not there is any relative shift between placements of the pair of CCD line sensors; and
   if there is a relative shift between the placements of the pair of CCD line sensors, computing the shape of the conveyed sheet by compensating for the relative shift in the placements.

7. The method as defined in claim 3, wherein:
   disposing a pair of CCD line sensors for measuring along the entire lengths of the two edge portions of the conveyed sheet at left and right positions in a widthwise direction of the conveyed sheet;
   conveying a calibration sheet on which square meshes uniform in line width are arrayed in grid form at a speed that is low enough to prevent meandering and imaging the calibration sheet with the pair of CCD line sensors;
   determining from images of the calibration sheet obtained by the imaging as to whether or not there is any relative shift between placements of the pair of CCD line sensors; and
   if there is a relative shift between the placements of the pair of CCD line sensors, computing the shape of the conveyed sheet by compensating for the relative shift in the placements.

8. The method as defined in claim 4, wherein:

disposing a pair of CCD line sensors for measuring along the entire lengths of the two edge portions of the conveyed sheet at left and right positions in a widthwise direction of the conveyed sheet;

conveying a calibration sheet on which square meshes uniform in line width are arrayed in grid form at a speed that is low enough to prevent meandering and imaging the calibration sheet with the pair of CCD line sensors;

determining from images of the calibration sheet obtained by the imaging as to whether or not there is any relative shift between placements of the pair of CCD line sensors; and if there is a relative shift between the placements of the pair of CCD line sensors, computing the shape of the conveyed sheet by compensating for the relative shift in the placements.

9. An apparatus which makes an online measurement of a shape of a conveyed sheet, the apparatus comprising:

a CCD line sensor adapted to perform a continuous imaging along entire lengths of at least two edge portions of the conveyed sheet in a direction of conveyance of the conveyed sheet beginning at a leading end and continuing to a trailing end of the conveyed sheet;

a plurality of the CCD line sensors disposed at a plurality of positions in the direction of conveyance of the conveyed sheet such as to be able to simultaneously image the leading end and the trailing end of the conveyed sheet;

an image processing device adapted to process an image obtained by the continuous imaging to extract a sheet image portion corresponding to the conveyed sheet in the obtained image; and a computation device adapted to compute a shape of the conveyed sheet according to the extracted sheet image portion.

10. The apparatus as defined in claim 9, wherein the computation device computes a pixel-by-pixel resolution of the CCD line sensors from the extracted sheet image portion and a line speed, draws four approximate lines for four sides of the conveyed sheet, and computes a slit width, a cut length and a perpendicularity of the conveyed sheet according to distances between points of intersection of the four approximate lines and angles at which the approximate lines intersect.

11. A method of making an online measurement of a shape of a conveyed sheet, the method comprising:

disposing a pair of CCD line sensors for measuring along entire lengths of at least two edge portions of the conveyed sheet at left and right positions in a widthwise direction of the conveyed sheet;

continuously imaging along entire lengths of the at least two edge portions of the conveyed sheet in a direction of conveyance of the conveyed sheet, beginning at a leading end of the conveyed sheet and continuing to a trailing end of the conveyed sheet, the imaging being performed by a CCD line sensor;

processing an image obtained in the imaging step to extract a sheet image portion corresponding to the conveyed sheet in the obtained image;

obtaining a shape of the conveyed sheet according to the sheet image portion extracted in the processing step;

conveying a calibration sheet on which square meshes uniform in line width are arrayed in grid form at a speed that is low enough to prevent meandering and imaging the calibration sheet with the pair of CCD line sensors;

determining from images of the calibration sheet obtained by the imaging as to whether or not there is any relative shift between placements of the pair of CCD line sensors; and if there is a relative shift between the placements of the pair of CCD line sensors, computing the shape of the conveyed sheet by compensating for the relative shift in the placements of the pair of CCD line sensors.

* * * * *